United States Patent
Ishtiaq et al.

(10) Patent No.: US 9,888,279 B2
(45) Date of Patent: Feb. 6, 2018

(54) CONTENT BASED VIDEO CONTENT SEGMENTATION

(71) Applicant: ARRIS Enterprises, Inc., Suwanee, GA (US)

(72) Inventors: Faisal Ishtiaq, Chicago, IL (US); Benedito J. Fonseca, Jr., Glen Ellyn, IL (US); Kevin L. Baum, Rolling Meadows, IL (US); Anthony J. Braskich, Palatine, IL (US); Stephen P. Emeott, Rolling Meadows, IL (US); Bhavan Gandhi, Vernon Hills, IL (US); Renxiang Li, Lake Zurich, IL (US); Alfonso Martinez Smith, Algonquin, IL (US); Michael L. Needham, Palatine, IL (US); Isselmou Ould Dellahy, Lake in the Hills, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/483,507

(22) Filed: Sep. 11, 2014

(65) Prior Publication Data

US 2015/0082349 A1 Mar. 19, 2015

Related U.S. Application Data

(60) Provisional application No. 61/877,292, filed on Sep. 13, 2013.

(51) Int. Cl.
*H04N 5/445* (2011.01)
*H04N 21/431* (2011.01)
(Continued)

(52) U.S. Cl.
CPC ..... *H04N 21/4316* (2013.01); *G06K 9/00711* (2013.01); *G06K 9/00765* (2013.01);
(Continued)

(58) Field of Classification Search
CPC .......... H04N 21/4316; H04N 21/4828; H04N 21/812; H04N 21/4884; H04N 21/23418; H04N 21/2353
(Continued)

(56) References Cited

U.S. PATENT DOCUMENTS 5,614,940 A 3/1997 Cobbley et al.
5,703,655 A 12/1997 Corey et al.
(Continued)

FOREIGN PATENT DOCUMENTS

EP 720114 A2 1/2001
EP 741487 A2 12/2001
(Continued)

OTHER PUBLICATIONS

H. Boril, et al., "Automatic Excitement-Level Detection for Sports Highlights Generation", Interspeech, Sep. 26-30, 2010, pp. 2202-2205.
(Continued)

*Primary Examiner* — Michael B Pierorazio
(74) *Attorney, Agent, or Firm* — Stewart M. Wiener

(57) ABSTRACT

A method receives video content and metadata associated with video content. The method then extracts features of the video content based on the metadata. Portions of the visual, audio, and textual features are fused into composite features that include multiple features from the visual, audio, and textual features. A set of video segments of the video content is identified based on the composite features of the video content. Also, the segments may be identified based on a user query.

20 Claims, 12 Drawing Sheets

(51) Int. Cl.

| | | |
|---|---|---|
| H04N 21/234 | (2011.01) | |
| H04N 21/235 | (2011.01) | |
| H04N 21/482 | (2011.01) | |
| H04N 21/488 | (2011.01) | |
| H04N 21/81 | (2011.01) | |
| G06K 9/00 | (2006.01) | |

(52) U.S. Cl.
CPC ... *H04N 21/2353* (2013.01); *H04N 21/23418* (2013.01); *H04N 21/4828* (2013.01); *H04N 21/4884* (2013.01); *H04N 21/812* (2013.01); *G06K 2209/27* (2013.01)

(58) Field of Classification Search
USPC .......................................................... 725/40
See application file for complete search history.

(56) References Cited

U.S. PATENT DOCUMENTS

| | | |
|---|---|---|
| 6,411,725 B1 | 6/2002 | Rhoads |
| 6,608,930 B1 | 8/2003 | Agnihotri et al. |
| 6,741,684 B2 | 5/2004 | Kaars |
| 6,801,261 B1 | 10/2004 | Haynes |
| 6,973,256 B1 | 12/2005 | Dagtas |
| 7,035,468 B2 * | 4/2006 | Yogeshwar et al. .......... 382/232 |
| 7,092,888 B1 * | 8/2006 | McCarthy et al. ........... 704/277 |
| 7,110,664 B2 * | 9/2006 | Yogeshwar et al. .......... 386/328 |
| 7,444,069 B1 | 10/2008 | Bernsley |
| 7,505,671 B2 | 3/2009 | Hagiwara et al. |
| 7,584,428 B2 | 9/2009 | Yeh et al. |
| 7,689,613 B2 | 3/2010 | Candelore |
| 7,774,815 B1 * | 8/2010 | Allen .............................. 725/80 |
| 7,783,490 B2 | 8/2010 | Reichardt et al. |
| 7,801,910 B2 * | 9/2010 | Houh et al. .................... 707/765 |
| 7,814,524 B2 * | 10/2010 | Candelore ..................... 725/113 |
| 7,886,003 B2 | 2/2011 | Newnam et al. |
| 7,889,073 B2 | 2/2011 | Zalewski |
| 7,908,628 B2 * | 3/2011 | Swart et al. .................... 725/93 |
| 7,992,167 B2 | 8/2011 | Candelore et al. |
| 8,020,183 B2 | 9/2011 | Ferman et al. |
| 8,035,656 B2 | 10/2011 | Blanchard et al. |
| 8,103,648 B2 | 1/2012 | Kritt et al. |
| 8,296,808 B2 * | 10/2012 | Hardacker ............. H04N 7/163 725/131 |
| 8,423,363 B2 * | 4/2013 | Gupta et al. ................... 704/255 |
| 8,572,488 B2 * | 10/2013 | Phillips et al. ................ 715/716 |
| 8,694,533 B2 * | 4/2014 | Oztaskent ......... G06F 17/30026 707/769 |
| 8,712,218 B1 * | 4/2014 | Begeja .................... G11B 27/11 386/248 |
| 8,763,042 B2 | 6/2014 | Ishtiaq et al. |
| 2001/0049826 A1 | 12/2001 | Wilf |
| 2002/0157116 A1 | 10/2002 | Jasinschi |
| 2002/0170068 A1 * | 11/2002 | Rafey et al. ................... 725/112 |
| 2003/0025832 A1 * | 2/2003 | Swart et al. ................... 348/461 |
| 2003/0206717 A1 * | 11/2003 | Yogeshwar et al. ............ 386/69 |
| 2004/0096110 A1 * | 5/2004 | Yogeshwar ......... G06F 17/3028 382/239 |
| 2004/0167767 A1 | 8/2004 | Xiong et al. |
| 2005/0120391 A1 | 6/2005 | Haynie et al. |
| 2005/0188411 A1 * | 8/2005 | Dacosta ........................ 725/110 |
| 2006/0015339 A1 * | 1/2006 | Charlesworth et al. ....... 704/251 |
| 2006/0218573 A1 | 9/2006 | Proebstel |
| 2007/0041706 A1 | 2/2007 | Gunatilake |
| 2007/0061862 A1 * | 3/2007 | Berger et al. .................. 725/139 |
| 2007/0112837 A1 * | 5/2007 | Houh et al. .................... 707/102 |
| 2007/0124756 A1 * | 5/2007 | Covell et al. ................... 725/18 |
| 2007/0124788 A1 * | 5/2007 | Wittkoter ...................... 725/112 |
| 2007/0214488 A1 | 9/2007 | Nguyen et al. |
| 2008/0091713 A1 * | 4/2008 | Candelore et al. ....... 707/103 R |
| 2008/0097984 A1 * | 4/2008 | Candelore ........................ 707/5 |
| 2008/0127253 A1 | 5/2008 | Zhang et al. |
| 2008/0204595 A1 * | 8/2008 | Rathod et al. ................. 348/465 |
| 2008/0262996 A1 * | 10/2008 | Yogeshwar et al. .............. 707/1 |
| 2010/0153984 A1 | 6/2010 | Neufeld |
| 2010/0316131 A1 * | 12/2010 | Shanableh ............ G06T 7/0002 375/240.24 |
| 2011/0069940 A1 * | 3/2011 | Shimy et al. .................. 386/296 |
| 2011/0145883 A1 * | 6/2011 | Godar et al. ................... 725/131 |
| 2011/0289530 A1 * | 11/2011 | Dureau et al. ................... 725/38 |
| 2001/1030477 | 12/2011 | Blanchard et al. |
| 2012/0224765 A1 | 9/2012 | Kim et al. |
| 2012/0242897 A1 | 9/2012 | Chattopadhyay et al. |
| 2013/0182182 A1 | 7/2013 | Mountain |
| 2014/0098293 A1 | 4/2014 | Ishtiaq et al. |
| 2014/0282642 A1 | 9/2014 | Needham et al. |

FOREIGN PATENT DOCUMENTS

| | | |
|---|---|---|
| EP | 1277337 A2 | 1/2003 |
| WO | 02080546 A1 | 10/2002 |
| WO | 03/051031 A2 | 6/2003 |
| WO | 2004053732 A2 | 6/2004 |
| WO | 2012027594 A2 | 3/2012 |
| WO | 2013/089965 A1 | 6/2013 |

OTHER PUBLICATIONS

S. K. Kim, et al., "A Personal Videocasting System with Intelligent TV Browsing for a Practical Video Application Environmnet", ETRI Journal, vol. 31, No. 1, Feb. 2009, pp. 10-20.

X. Gao, et al., "Unsupervised Video-Shot Segmentation and Model-Free Anchorperson Detection for News Video Story Parsing", IEEE Transactions on Circuits and Systems for Video Technology, vol. 12, No. 9, Sep. 2002, pp. 765-776.

M. Desanto, et al., "Unsupervised News Video Segmentation by Combined Audio-Video Analysis", Springer 2006, pp. 273-281.

S. Agamanaolis, et al., "Viper: A framework for responsive television", IEEE Computer Society, 2003, pp. 88-98.

C. Lee, et al., "Emotionally Reactive Television", IUI, Jan. 28-31, 2007, 4 pgs.

PCT Search Report & Written Opinion, RE: Application No. PCT/US2014/055155, dated Dec. 11, 2014.

N. Haas, et al., "Personalized News Through Content Augmentation and Profiling", IEEE International Conference on Image Processing (ICIP), vol. 2, Sep. 22, 2002, pp. 9-12.

A. Hauptmann, et al., "Text, Speech and Vision for Video Segmentation: The Informedia Project", AAAI Fall Symposium, Computational Models for Integrating Language and Vision, Jan. 1, 1995, 6 pgs.

PCT Search Report & Written Opinion, RE: Application No. PCT/US2014/048562, dated Oct. 22, 2014.

PCT Search Report & Written Opinion, RE: Application No. PCT/US2014/036176, dated Oct. 7, 2014.

N. Dimitrova, et al., "MPEG-7 Videotext Description Scheme for Superimposed Text in Images and Video", Signal Processing: Image Communication, Elsevier Science Publishers, vol. 16, No. 1-2, Sep. 1, 2000, pp. 137-155.

Offical Action, RE: Mexican Application No. MX/a/2016/003315, dated Mar. 3, 2017.

Official Action, RE: Canadian Application No. 2,924,065, dated Oct. 11, 2016.

Y. Rui, et al., "Automatically Extracting Highlights for TV Baseball Programs", Microsoft Research, Multimedia '00 Proceedings of the eighth ACM international conference on Multimedia, Nov. 2000.

D. Brezeale, "Learning Video Preferences Using Visual Features and Closed Captions", IEEE Computer Society, IEEE MultiMedia, vol. 16, Issue 3, Sep. 2009.

N. Nitta, et al., "Automatic Story Segmentation of Closed-Caption Text for Semantic Content Analysis of Broadcasted Sports Video", International Workshop on Multimedia Information Systems, 2002.

H.K. An, et al., "Cognitive Face Analysis System for Future Interactive TV", IEEE Transactions on Consumer Electronics, vol. 55, Issue: 4, Nov. 2009.

(56) References Cited

OTHER PUBLICATIONS

S. Lee, et al., "Viewer Responses to Interactive Narrative: A Comparison of Interactive Versus Linear Viewership in Alone and Group Settings", Communication Technology division of International Communication Association, dated May 2005.

\* cited by examiner

CONTENT BASED VIDEO CONTENT SEGMENTATION

CROSS-REFERENCES TO RELATED APPLICATIONS

The present disclosure claims priority to U.S. Provisional Patent Application No. 61/877,292, entitled "Enabling Enhanced Viewing Experiences," filed on Sep. 13, 2013, the content of which is incorporated herein by reference in its entirety for all purposes.

BACKGROUND

Videos can be used to convey a wide variety of audiovisual content. From entertainment video content, such as movies, television programs, music videos, and the like, to informational or instructional content, like newscasts, documentaries, product advertisements, and educational material, video content offers a rich and effective means for communicating information.

Video content is available in digital form and can be recorded or transmitted in one or more electronic formats. For example, traditional cable and satellite television service providers transmit live and prerecorded digital video signals to consumers over corresponding wired and wireless electronic communication media in real time according to a broadcast schedule. That is, conventional television (TV) viewers generally consume TV content linearly; e.g., they generally watch a TV program from beginning to end, with limited interactions such as pausing, rewinding, and fast-forwarding. In addition many cable and satellite television service providers, and other web based services, have developed functionality to provide video content to consumers using so-called "video-on-demand" (VOD) systems. VOD systems allow service providers to provide specific video assets, such as television shows, movies, and the like, in response to user requests to any number of client devices for viewing. Such live video and VOD content is usually transmitted as video data. The video data can include constituent visual data, audio data, and, in some instances, textual data (e.g., closed captioning data). As users experience other video technologies, they expect more functionality and experiences from their TV content providers. More specifically, users expect the ability of searching for content, watching content in a non-linear manner, or watching only the content that interests them.

In many of the video formats, the visual data is recorded as a sequence of frames that include still images resulting from the arrangement of pixels. Accordingly, the visual data can include a set of frames in which each frame includes a specific set of pixel data that, when rendered by a computer system, results in the corresponding visual content (e.g., images of people, places, and objects) of the video content.

In some scenarios, the visual content might include images of text. Images of text may include images of text on objects in a scene (e.g., words or characters on buildings, signs, or written documents, etc.). The visual content may also include rendered text superimposed over the images of a scene of the visual content. For instance, some television stations may embed on-screen text into visual content of a news broadcast to display summary information, captioning, or to introduce individual stories or segments. Similarly, talk shows may use on-screen text to identify people or topics, while programs showing or discussing sporting events may display on-screen text with running statistics about one or more games (e.g., score, period, time, etc.). Text that appears in the images of a scene or text that is embedded into or superimposed on the image of the scene are referred to herein as "on-screen text."

On-screen text is distinguishable from text rendered from textual data (e.g., a text string from closed captioning information) in that on-screen text does not correspond to underlying data that includes specifications or other indications of the text. Rather, on-screen text is only recognizable by examining the images that result from rendering the corresponding pixel data of the visual data.

Audio data and/or textual data often accompanies the visual content to present a complete audiovisual experience. The audio data typically includes sounds, such as voices, scene noises, music and the like. The textual data can be rendered along with the visual content to give additional context, labels, and titles to the visual content. In some scenarios the textual data can give textual representation of speech and other sounds in the audio content so hearing impaired individuals can access it.

DETAILED DESCRIPTION

Described herein are techniques for systems, methods, and devices for generating segments of video content based on visual, audio, and textual features for linear or non-linear viewing. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Overview

Figure 1A:
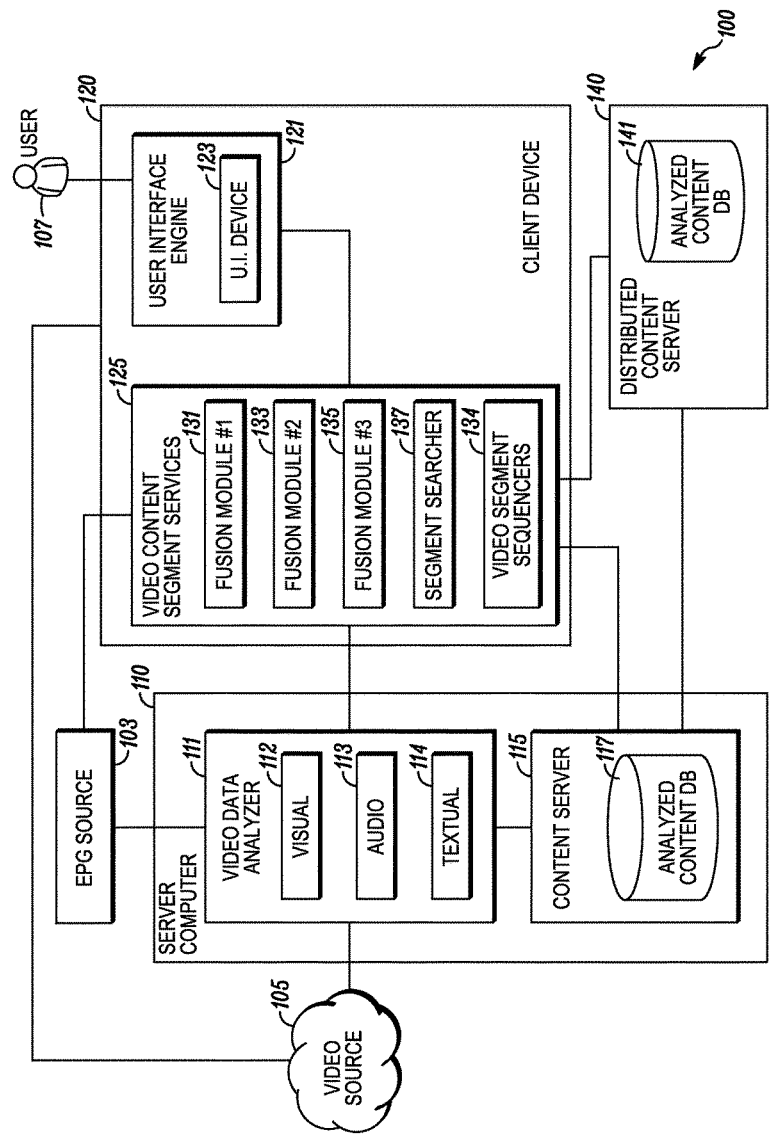
FIG. 1A illustrates a block diagram of a system for determining segments of video content, according to embodiments of the present disclosure.

FIG. 1A depicts a high-level schematic diagram of a system 100 for providing functionality associated with the presentation and consumption of video content. System 100 can analyze metadata to extract visual, audio, and textual features of video content. The features may be information from the video content. The extracted features are then used to generate video segments. The video segments can be characterized or categorized according to specific features detected in the visual, audio, and/or textual features of the video content. Representations of a video asset with its feature video segments can then be generated and displayed along with controls for playing the segments in a linear fashion (e.g., from beginning to end) or non-linear fashion (e.g., watching specific clips/segments of a program in an arbitrary order). In some embodiments, the segments can be augmented with additional video content, such as commercials, extended content (e.g., deleted scenes, outtakes, etc.), commentary, or external content relevant to the video content (for example, an Internet link or content from an Internet web page may be embedded in the produced segment). Also, segments may be created based on user queries. In other embodiments, portions of the video content may be combined in a different order to produce the video segments (for instance, assume that the original video content has non-advertisement content P1 in between seconds 100 and 400 followed by an advertisement A1 in between seconds 400 and 430. A video segment with duration of 100 seconds may be generated with the advertisement A1 in between seconds 0 and 30 followed by the portion of the content P1 in between seconds 330 and 400. These and other embodiments of the present disclosure are described in more detail herein in reference to the figures.

System Overview

System 100, as illustrated in FIG. 1A, can include components and functionality for analyzing video content to extract visual, audio, and textual content features that can be used to divide the video content into corresponding segments. As shown, system 100 can include a server computer 110 and a client device 120 in electronic communication with one another. For example, server computer 110 can be a computer system at the headend facility of a cable television service provider used for distributing video content to multiple subscribers. Client device 120 can include any computing device or thin client device (e.g., desktop computer, laptop computer, tablet computer, smart phone, set-top-box, etc.) capable of receiving and decoding data and/or signals from the server computer 110. In such embodiments, the server computer 110 and client device 120 can include memory (e.g., volatile and non-volatile computer readable media) and one or more computer processors for storing and executing functional modules (e.g., executable code and programs) for implementing the various functionality described herein.

Video Data Analysis

In embodiments, video data can be analyzed to generate corresponding visual, audio, and textual features. As described above, server computer 110 can execute one or more modules to implement various analytical functionality in accordance with embodiments of the present disclosure. In one embodiment, the server computer 110 includes a video data analyzer 111 that analyzes video data received from a video source 105. The video data analyzer 111 can include various content type specific modules for analyzing different types of content data included in the video data. For example, the video data analyzer 111 can include a visual data module 112, an audio data module 113, and a textual data module 114 for identifying, extracting, or performing analysis on the visual, audio, and textual features of the video data.

In one embodiment, the video data analyzer 111 can stream the visual data, audio data, and textual data directly to the client device 120 in real time. In such embodiments, the video source 105 can provide the video data directly to the video data analyzer 111 in parallel with the transmission of the video data to the client device 120. Accordingly, the client device 120 can coordinate the video data from the video source 105 with the visual data, audio data, and textual data provided by the video data analyzer 111.

The server computer 110 can also include a content server 115 that stores the video data and the features for the visual data, audio data, and textual data in an analyzed content database 117. In such embodiments, the content server 115 can be used as a repository of video data for on-demand delivery of video data to one or more client devices 120. When the content server 115 provides the client device 120 with video data it can also provide the corresponding visual, audio, and/or textual features.

In one embodiment, the video data analyzer 111 and/or the client device 120 can receive metadata, such as electronic program guide (EPG) data from an EPG source 103. The EPG data can include information regarding the program lineup for a particular television/cable channel. Accordingly, the EPG data can be used as an indication of context for the analysis of the video data. The use of such context can improve the efficacy and accuracy of the analysis that generates the visual, audio, and/or textual features.

For example, video data received from a video source 105 may include a particular video asset (e.g., a movie, newscast, sports event, television program, etc.). The EPG source 103 can provide EPG data (e.g., start/stop times, duration, synopsis, channel designations, descriptions, categories, etc.) for that particular video asset. Based on the EPG data, the video data analyzer 111 can determine the context of the data that will inform the analysis of the type of visual data, audio data, and textual data that might be included in the corresponding video data. For instance, if the EPG data indicates that a particular program is a financial news broadcast, then the video data analyzer 111 can determine that that specific financial newscast, or a corresponding type of financial newscast on the specified channel, typically includes on-screen logos and text in the bottom right-hand corner of the screen as well as scrolling text with information about stock prices along the bottom edge of the screen. That same EPG data may also indicate to the video data analyzer that the face of various news broadcasters will also be depicted in frames of the visual data of the newscast. The EPG data can also indicate that the voices of the newscasters can be expected in the corresponding audio data. Similarly, EPG data for a movie or music video may indicate to the video data analyzer 111 that specific sounds or types of musical tracks may be included in the audio data.

In various embodiments, the video data analyzer 111, can detect, extract, catalog, and correlate various visual, audio, and/or textual features of video content. As described herein, video data for video content can include a combination of visual data, audio data, and/or textual data corresponding to the visual, audio, and/or textual features of the video content. Accordingly, the video data analyzer 111 can include functionality for analyzing the visual, audio, and/or textual features individually and in combination to generate additional or supplemental data. Any data resulting from the analysis of the video data can be correlated to a corresponding frame and/or frame region in the visual content.

In one embodiment, the visual module 112 of the video data analyzer 111 can analyze the visual data to detect data corresponding to on-screen text or objects. The images in a frame of visual content can include an arrangement of pixels. Accordingly, in one embodiment, the analysis of the visual data can include performing an optical character recognition (OCR) operation, or other recognition operation, to recognize patterns in the pixels that correspond to individual objects, characters, words, or phrases included in the visual data. The recognized patterns may include, for example, logos, call signs, and other objects in the visual content. The recognized patterns can then be associated with textual data or image data that describes the recognized patterns. The recognized on-screen text or object can then be associated with the corresponding regions in the frames or frame sequences in which it appears. Accordingly, the on-screen text or objects and their corresponding textual data and object data can be associated with the corresponding regions, frames, and/or video assets in which they appear.

In embodiments, text data corresponding to recognized on-screen text can include computer readable code that defines specific characters or words (e.g., text strings defined by ASCII or binary codes). The textual data can then be associated with the regions, frames, and/or video assets in which the on-screen text was recognized. In such embodiments, the textual data can be provided, along with the original or transcoded video data to the client device 120, as supplemental data.

In one embodiment, audio module 113 of the video data analyzer 111 can analyze the audio data of the video data to detect various audio characteristics or features. For example, the audio module can recognize voices, songs, sound effects, noises, tones, and other audio features. Such analysis can include generating identifiers or descriptions (e.g., song names, actors' names, adjectives, etc.) associated with the various audio features. For example, the audio module 113 can detect a particular song and generate a corresponding song title. Similarly, in some embodiments, the audio module can detect the presence of the sound of thunder in the audio data and associate it with indications of stormy, rainy, dark, ominous, etc.

In one embodiment, textual module 114 can detect keywords or phrases from textual data included in the EPG data or closed captioning data associated with the video data. The detected keywords can then be associated with the frames or ranges of frames with which they are associated. Textual content, which may comprise closed-captioning text, on-screen text, and the like, is separated from audio, video and other content. Each discrete element of text content is a text record. A text record comprises at least a start time and a representation of the text itself, where the start time indicates the point in time within the video content at which the text occurs. The text record may additionally comprise other fields, such as an end time, the time within the video content at which the text is no longer displayed. Furthermore, as each text record is received, it is stored in a database. After being stored, the non-duplicated text portion of the text record is identified, and the significant words are extracted and stored. The non-duplicated portion of the text is words or lines of text that did not appear in the previously-stored text record.

In an embodiment, from the non-duplicated portion, significant words are identified. Significant words, for example, are all words other than commonly-occurring words in a language, such as articles and conjunctions (e.g. "a", "an", "the", "he"). The identified significant words are stored in the database with the text record. Finally, upon reaching the end of the visual, audio, and textual (e.g., elementary streams) of the video content (e.g., the completion of the video program or video clip), a textual program index is created. A textual program index, in an illustrative example, comprises a collection of all non-duplicated significant words stored with the text records for a single piece of visual, audio, and textual features of the video content. The collected significant words are stored in the database with an identifier of the video content (e.g., an identifier included in EPG data 143).

As used herein the term "detector output data" describes data generated by the video data analyzer 111, or its visual, audio, or textual modules 112, 113, and 114. Such data can include, but is not limited to, visual, audio, and/or textual features and the corresponding correlations to specific video assets or frames within the video assets. The detector output data can be associated with multiple video assets from multiple video sources 105 (e.g., multiple television programs broadcast by multiple television channels).

Video Segmentation

Like the server computer 110, the client device 120 can include modules implemented as combinations of hardware and executable code to provide various functionality that can use the detector output data to characterize and/or divide the video data into segments.

In one embodiment, the client device 120 can include a user interface engine 121. User interface engine 121 can include functionality for receiving, decoding, rendering, and displaying information received from various sources, such as video source 105, EPG 103, and server computer 110. In one embodiment, the user interface engine 121 can receive video data for video content and render the visual, audio, and textual components of the video content on one or more output devices (e.g., computer monitors, speakers, etc.). One example of client device 120 and user interface engine is a set-top box and a user device, such as a television.

In addition, the user interface engine 121 can receive EPG data and render it along with controls superimposed over the visual component of the video content. For example, user interface agent 121 can generate a graphical user interface (GUI) that includes GUI elements overlaid on the video content. In one embodiment, the user interface engine 121 can include or be coupled to a user interface device 123 (e.g., a remote control receiver, a touchscreen, a mouse, a camera, etc.) for receiving user input from a user 107. In such embodiments, the user interface device 123 can be used to interact with the underlying GUI generated by the user interface engine 121 and thereby control/interact with other components of system 100.

In some embodiments, the user interface engine 121 can provide access to the functionality of the video content segment service module 125 implemented in the client device 120. In one embodiment, the video content segment service 125 can receive detector output data associated with video content that specifies one or more visual, audio, and/or textual features associated with one or more frames of one or more video assets. Based on the visual, audio, and/or textual features associated with the frames of the video asset, the video content segment service module 125 can divide the video content of the video asset into segments of frames sequences associated with specific visual, audio, and/or textual features. For example, the beginning of a segment associated with a particular keyword may be defined as the first frame in which that keyword appears in the visual or textual data and the end of the segment can be defined as the last frame in the sequence in which the keyword appears. As another example, the various portions of a newscast (e.g., local news, national news, weather, sports, entertainment, etc.) may be partitioned in various segments.

In some embodiments, the video content segment service module 125 can include sub modules that include specific functionality for analyzing the visual, audio, and textual detector output data to generate segment definitions for the corresponding video data. For example, the video content segment service module 125 can include a first fusion module 131, a second fusion module 133, and a third fusion module 135; and one or more video segment sequencers 134 to segment the video data based on the corresponding visual, audio, and textual detector output data. The video content segment service module 125 can include any number of fusion modules and video segment sequencers. Each fusion module may rely on visual, audio, and textual detector output data to generate a different output than other fusion modules. The various sequencer modules 134 receive the information from the fusion modules 131, 133, 135 and produce the final video segments to be sent to the user interface 121. The final video segments produced by the sequencer modules contain portions of the video content that may be combined in a different order to produce the video segments or may include portions of the other video assets stored in the content server 115 or even include portions from other databases (for example, the video segments may contain advertisements coming from an advertisement database). The video content segment services module 125 can also include a segment searcher module 137 for searching for segments based on an associated key items, such as visual, audio, and/or textual features including words/phrases, sounds, songs, people, objects, etc. in the associated detector output data or the segment definitions. In one embodiment, the client device 120 can receive key items in the form of text, voice commands, or recognition of other sounds (e.g., using a microphone to receive the sound pattern of a particular song). In other embodiments, the client device 120 can receive key items in the form of images captured by a camera or other imaging device in the client device 120.

In one embodiment, the video content segment service module 125 can generate segment definitions that include information for identifying a particular segment in a particular video asset. Specifically, the segment definition can include a video asset identifier, a visual, audio, or textual key item identifier, a start frame identifier, a frame count, and/or an end frame identifier. In some embodiments, the start frame identifier, stop frame identifier, and frame duration can include or be associated with corresponding time stamps that indicate the time within a particular video asset at which they occur.

In one embodiment, system 100 can include a distributed content server 140 with an analyzed content database 141 for providing storage of detector output data and/or segment definitions. The distributed content server 140 can be co-located with the client device 120 to provide ready access to previously analyzed video data, detector output data, and segment definitions. For example, the distributed content server 140 can be implemented as a component of the client device 120 or as a standalone peripheral or networked computer in the same local area network as the client device 120.

Figure 1B:
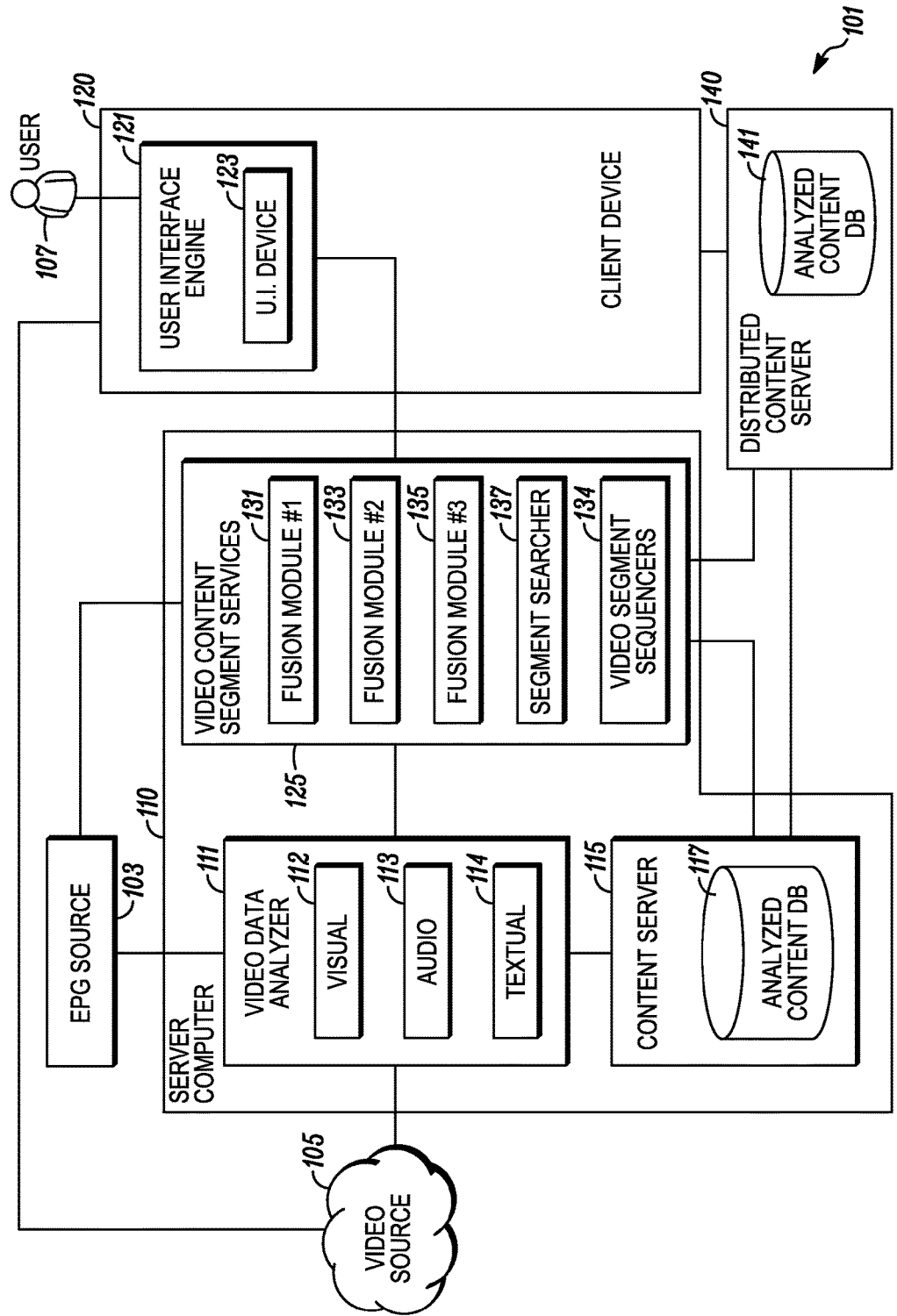
FIG. 1B illustrates a block diagram of another system for determining segments of video content, according to embodiments of the present disclosure.
Figure 1C:
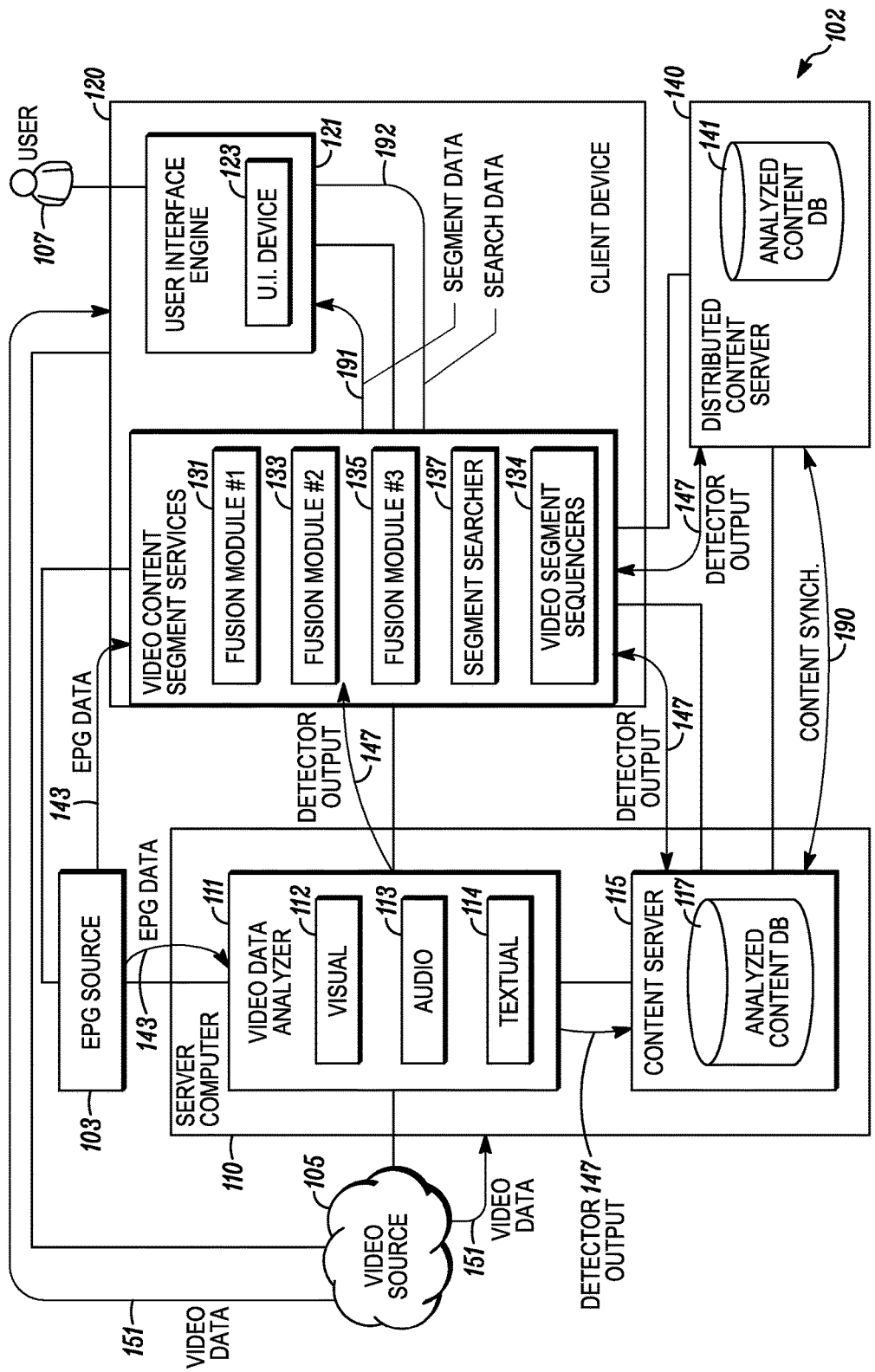
FIG. 1C illustrates a data flow for determining segments of video content, according to embodiments of the present disclosure.

FIG. 1B illustrates an alternative example implementation of system 100 as system 101 in which the video content segment services 125 is implemented as a module in the server computer 110. In such embodiments, the functionality of video data analyzer 111 and the video content segment services 125 described above, can be implemented in modules instantiated on the server computer 110. The video content segment services 125 may also be implemented in a separate server computer (not represented in FIG. 1A or 1B, which may located in the local area network of the server computer 110 or in a separate network. While FIGS. 1A and 1B depict the video content segment services 125 resident in the client device 120 or the server computer 110, respectively, the functionality and related data flows can be similar except for the necessary transmission of data over wide area networks, local area networks, and/or data buses between and within various computer systems and devices. Such data flows and functionality are described below more detail in reference to FIG. 1C.

In another embodiment, the video content segment services 125 produces segments that represent highlights of a video asset. For instance, when analyzing a video containing a baseball match, the video content segment services 125 may be produce segments containing only the home-runs or best moments.

Overview of Data Flow

To further illustrate various aspects and functionality of system 100, FIG. IC illustrates a particular example data flow 102 according to embodiments of the present disclosure. While specific functions are described as being performed by specific modules in specific computer systems, any of the functionality described herein may be distributed among the server computer 110, the client device 120, and one or more other computer system (e.g., in a cloud computing environment).

In one embodiment, the video content arrives at server computer 110 that may be located at a Main Switching Office (MSO). Usually such content arrives through satellite feeds, directly from the various content networks that supply the MSO with content; however, content may also arrive from other sources; for instance, videos from short form videos may also arrive at the MSO. Server computer 110 captures such content, stores it into local temporary storage, performs a series of transformations and manipulations in the content in order to allow it to be transmitted over its transmission equipment and be consumed by various types of devices.

As shown, the video data analyzer 111 can receive video data 151 from video source 105. The video source 105 can include any type of live or on-demand source of video content. For example, the video source 105 can be a cable television provider, a satellite television provider, a website, or the like. Accordingly, the video data 151 can include a live video stream or one or more stored files of video data. In either scenario, the video data 151 can include various formats of digital data.

The video data 151 can include digital data corresponding to the visual, audio, and/or textual data of the corresponding video content. For example, the video data 151 can include visual data, audio data, and/or textual data. In some embodiments, the video data 151 can include one or more video assets, such as television shows, movies, video clips, web videos, and the like.

In one embodiment, the video data analyzer 111 can receive and analyze the video data 151 to determine detector output data 147. As described herein, the detector output data 147 can include feature detector output data, such as visual, audio, and/or textual features. Each feature detector output data can be generated by a corresponding sub module of the video data analyzer 111, such as the visual module 112, the audio module 113, and the textual module 114. In one embodiment, the video data analyzer 111 can store the detector output data 147 in the content server 115. The content server 115 can associate the detector output data 147 with one or more specific frames or ranges of frames of the video data 151 in the analyzed content database 117. In other embodiments, the contents of the analyzed content database 117, such as the detector output data 147 and/or the video data 151, can be synchronized with one or more distributed content servers 140 using content synchronization data 190 transmitted over one or more electronic communication protocols and media (e.g., the Internet, data over cable, etc.).

In one embodiment, the video data analyzer 111 can receive EPG data 143 from the EPG source 103. The EPG data 143 can include metadata regarding the various video assets in the video data 151. For example, the EPG data can describe the divisions between the video assets (e.g., start/stop times) in the video data 151. The metadata in the EPG data 143 can be generated by the EPG source 103 in coordination with the video source 105. For example EPG data 143 can include published listings or schedules of programs offered by one or more video sources 105 (e.g., television networks, on-demand movie websites, etc.). The EPG data 143 can include information about the video data 151 in general and/or descriptions of the individual video assets. Such descriptions can include an identifier for a particular television program, movie, newscast, video clip, and the like. For example, the identifier can include a name of a sitcom, the title of the movie, the name of the television talk show, etc. In addition to the identifier, the EPG data 143 can include an indication of a classification or category of the type of video asset. Such indications can include designations that indicate what content can be expected in a particular video asset. For example, a designation can classify a particular video asset as a newscast, a comedy, a sporting event, a talk show, a financial news show, or the like.

The video data analyzer 111, or one of its modules, can use the EPG data 143 in the analysis of the video data 151. In one embodiment, the video data analyzer 111 can use the EPG data 143 to determine a context of the video data 151.

For example, the video data analyzer 111 can use context indicated in the EPG data 143 to improve the accuracy of the analysis of the video data 151. In one example, if the EPG data 143 for a particular video asset indicates that the video asset includes a sports talk show, then the video data analyzer can reference a specialized dictionary associated with sports talk shows to improve the accuracy of character recognition operations on the visual data of the video data 151. The specialized dictionary may include vocabulary and names specific to the genre of sports shows that the video data analyzer 111 can use to eliminate at least some potentially erroneous recognized characters or words.

Analysis of the video data 151 can include recognizing on-screen text or on-screen objects, and generating corresponding detector output textual data and/or image data. In some embodiments, detector output visual, audio, and/or textual features can be associated with specific frames or ranges of frames within the video asset or video data 151. For example, textual features corresponding to on-screen text that introduces a particular segment within a news broadcast can be associated with specific frames within the program in which the specific on-screen text appears. In this way, the frames of the news broadcast can be compiled into segments based on specific on-screen text (e.g., the title, topic, or name of a particular news segment). Similarly, in some embodiments, the video data analyzer 111 can also detect the presence of particular on-screen images of the visual content. For example, visual module 112 can detect the presence of a logo in the corner of the screen or the image of a person or object in other particular regions of the screen. Such detector output image features can be used to identify a particular television show or television channel.

In some embodiments, audio module 113 and/or the textual module 114 can analyze the corresponding detector output audio data and textual data (e.g., closed captioning data) for audio or text in those features of the video data 151. The audio or text features detected in the audio data and textual data of the video data 151 can be associated with the particular frames in which they are detected. Accordingly, the audio data and textual features can be used to further segment the video data 151 based on characteristic sounds (e.g., the sound of a particular person's voice, a particular song, a sound effect, etc.) or indications/markers in closed captioning data that indicates the beginning and end of a particular segment of a program. Segmentation of the video data 151 can be used by various components of the present disclosure to improve accuracy and efficiency of the analysis of the video data. For example, information about segments in the video data 151 can help the video analyzer 111 leverage the redundancy of the images in multiple frames of the visual content to improve the accuracy of character recognition of text in a frame in which the text is moving or otherwise difficult to recognize. If the text in one frame is difficult to recognize, the video analyzer 111 can analyze neighboring frames in the same segment to perhaps obtain a better image of the text (e.g., in better focus, higher contrast, etc.).

Any data detected in or extracted from video data 151 by the video data analyzer 111 can be associated with the corresponding frames and compiled as detector output data. Accordingly, within the detector output data, visual data, audio data, and textual data can be associated one or more frames of various video assets. For example, the detector output 147 can include text or images corresponding to on-screen text or objects detected in the visual data or the textual data of the video data 151. Similarly, the detector output data 147 can include sounds and/or voices associated with objects or people in the audio data.

The video content segment services 125 can receive the detector output data 147 directly from the video data analyzer 111, the content server 115, or distributed content server 140. In some embodiments, the video content segment services 125 can receive the video data 151 from the video source 105, while in others, the video segment services 125 can receive the video data 151 from the content server 115 and/or the distributed content server 140. In any such embodiments, the video content segment services 125 can generate segment definitions based on the detector output data 147, the video data 151, and/or the EPG data 143.

In some embodiments, the video content segment services 125 can include sub modules specifically configured to generate segment definitions corresponding to segments of video data 151 characterized by specific visual, audio, textual features. Accordingly, the video content segment services 125 can include a number of fusion modules, such as a first fusion module 131, a second fusion module 133, and a third fusion module 135, and one or more segment sequencers 134. Each fusion module 131, 133, and 135 processes the detector output data 147 and fuses them into composite features. Composite features represent information about the video content, including information about the cinematic structure of the video content and information about the objects, people, scenes and events depicted in the video content. For example, composite information may represent the location where editing of the video content likely occurred, such as at the boundary between shots or where music and visual effects signal the beginning of a new scene. Composite information may also represent when an actor or anchorperson begins speaking or singing or when an object or background is introduced in a semantic context of significance to the video content. Such information is generated from combinations or from functions of the features present in the detector output data 147. The composite features are also associated with one or more frames or a range of frames corresponding to the one or more frames or range of frames associated with the features from the detector output data 147 that were used by the fusion module to produce the composite feature. The various fusion modules use the composite features to classify the different segments of the video content. For example, the first fusion module 131 can generate information that classifies particular frames of a particular video asset as being or not being a portion of a commercial advertisement. Similarly, the second fusion module 133 can generate information that classifies particular frames of a particular video asset as being a portion of a news program. For example, the second fusion module 133 can identify which frames include the weather segment of a newscast.

Finally, the third fusion module 135 can generate information that correlates frames of video asset with important or exciting portions of a sports event. In such embodiments, the third fusion module 135 can relate information from the visual module 112, audio module 113, textual module 114, and EPG data 143 to determine the important or exciting portions of a sports event. Accordingly, the fusion module 135 can define video segments in which specific keywords, names, or phrases appear in the visual or textual content. The composite features from the various fusion modules are then used by the sequencer 134 to produce the various video segments. A segment definition may define the segments and can be saved as segment data 191 which can then be sent to the user interface engine 121.

User interface engine 121 can use the segment data to generate representations of the segments and render them in the UI device 123. In some embodiments, representations of the segments can include thumbnail images from the segments or textual representations of the segments. The representations of the segments can include one or more user interface elements through which a user 107 can enter user input to select the playback of specific segments. In response to user input, the client device 120 can send a request to the video source 105, the server computer 110, the content server 115, and/or the distributed content server 140 to retrieve and playback the specific frames from the specific video asset defined by the segment definition corresponding to the selected representation of the segment.

Playback of the selected segments can include various styles of linear and nonlinear play back. For example, when a user turns on client device 120, client device 120 provides indication to the user that the video content is available for both linear and non-linear consumption. Both versions are made available because a single client device 120 may serve multiple TVs and multiple users, which may prefer to watch the content differently. The user uses client device 120 to select whether to watch the content in the traditional linear manner or watch the content in the non-linear manner. If the user selects to watch the content in the traditional linear manner, client device 120 presents the content as it was received by server 110 (e.g., at the MSO).

If the user selects to watch the content non-linearly, then client device 120 presents a user interface that displays the various segments available in the video content. Each segment is indicated with text, an image, or a short audio/video clip from the segment. Alternatively client device 120 presents the user interface that displays the various segments in a display within the user device. Using client device 120, the user selects the desired segment to watch. For example, a user may select a group of segments that are associated with a common theme (e.g., segments defined by segment definitions that are each associated with the particular visual, audio, and/or textual features) to be played one after another in a linear fashion. In other embodiments, user may select a particular segment to play back first and then select another particular segment to play back next. The order in which the segments are play back is arbitrary and left up to the preferences of the user. Client device 120 then displays the selected segment from the video content to the user. At the end of the segment or when the user so desires, client device 120 displays the various segments available in the video content again. Accordingly, segment definitions according to various embodiments of the present disclosure greatly increase the flexibility with which a user may consume video content from one or more video assets.

In some embodiments, the segmentation of video content can also facilitate the insertion of customized or otherwise relevant secondary or supplemental content before, during, or after the playback of a particular segment. For example, targeted commercial advertisements relevant to the keywords, names, objects, or other features of a particular segment can be played back along with the segment. In another example, secondary audio tracks that include commentary relevant to the segments can be played back at the same time as a selected segment. In such embodiments, the secondary or supplemental content can be retrieved from the video source 105, the server computer 110, the content server 115, the distributed content server 140, or even a third-party server. In other embodiments, the supplemental content can be retrieved from a predetermined or user defined website. In one embodiment, the specific secondary content (e.g., a commercial) played before, during, after, or in between video segments can depend on the order of playback, the type of playback (e.g., linear versus non-linear), and one or more of the characteristics of the selected segment(s).

In one embodiment, the user 107, through the user interface engine 121 and/or the UI device 123, can enter search data 192 that the segment searcher 137 can use to determine one or more relevant segments. In some embodiments, the segment searcher 137 can search segment definitions that include or are otherwise associated with the search data 192. For example, the search data 192 can include a keyword, an actor's name, a sound description, a song title, etc. with which the segment searcher 137 can determine one or more target segment definitions. In such embodiments, the segment data 191 determined by the segment searcher 137 can be sent back to user interface engine 121 to display representations of the target segment definitions.

Figure 2A:
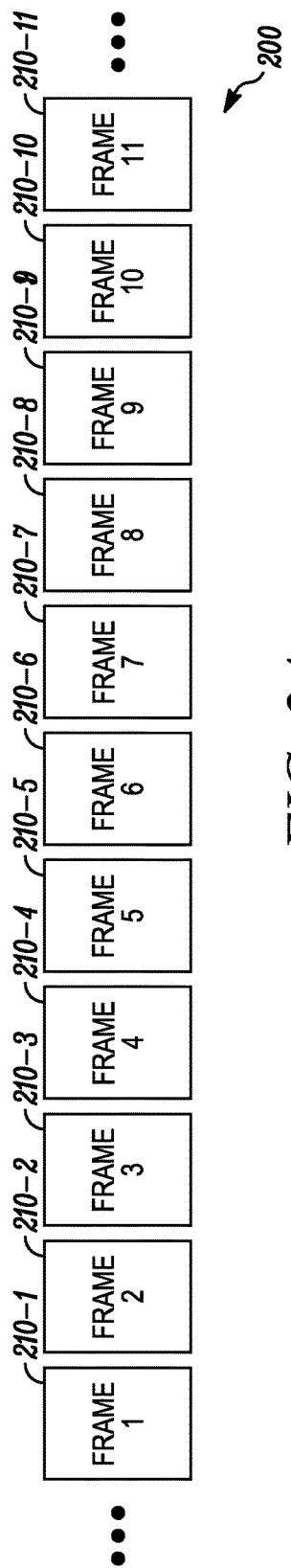
FIG. 2A depicts example frames of video content that can be used in various embodiments of the present disclosure.
Figure 2B:
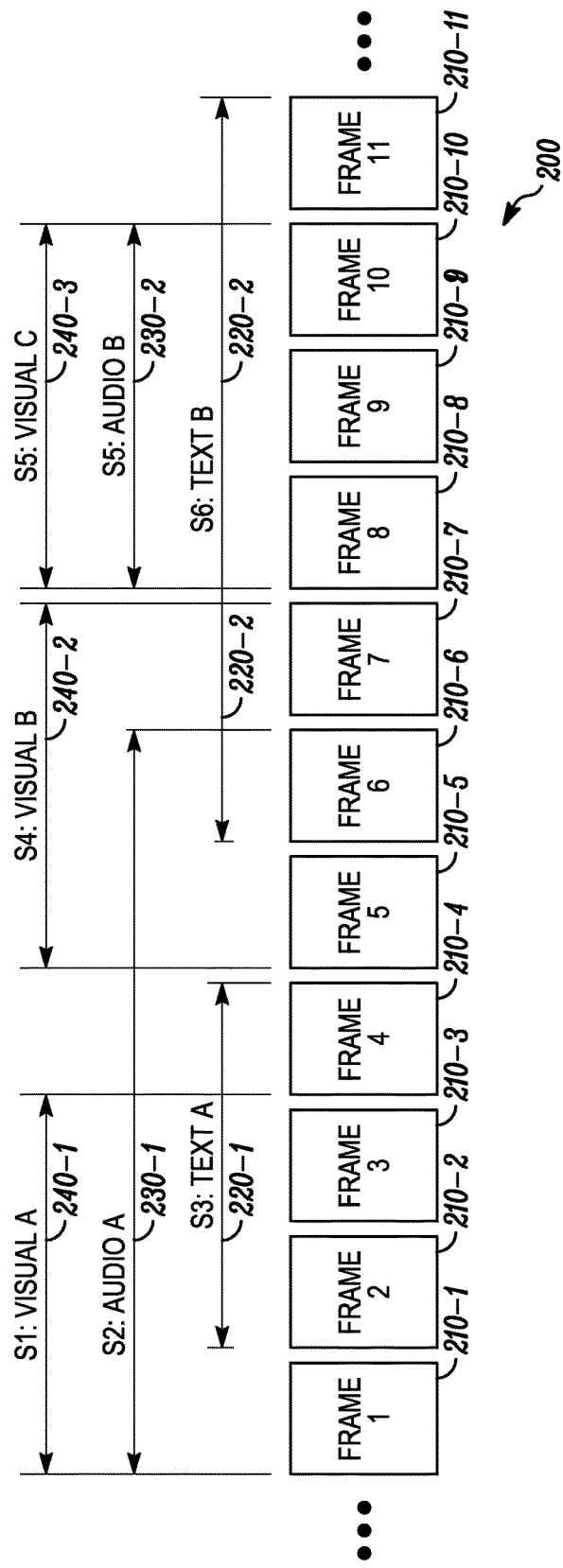
FIG. 2B depicts a schematic of visual, audio, and textual based segments of video content, according to embodiments of the present disclosure.
Figure 2C:
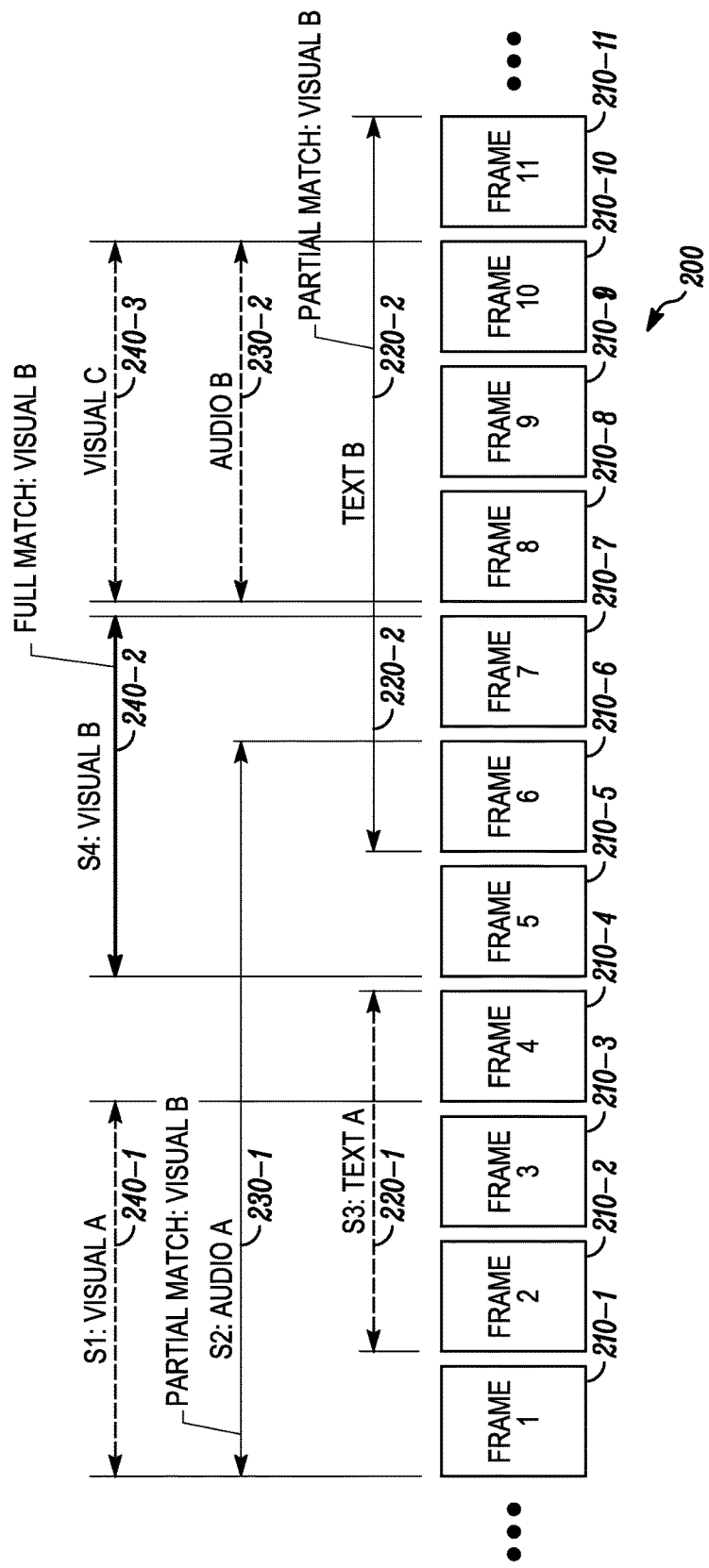
FIG. 2C depicts a schematic of matched segments of video content, according to embodiments of the present disclosure.

FIGS. 2A through 2C illustrate segmentation of video content 200 according to specific detector output data and the insertion of supplemental content into the playback of a selected segment. FIG. 2A illustrates a representation of frame-based video content 200 of a particular video asset. Such frame-based video content 200 can include frames 210 of visual content, audio content, and textual content. Accordingly, to play the video content 200, the frames 210 can be rendered according to a particular ordered sequence.

As described herein, the video content segment services 125 can segment the video content 200 according to detector output data 147. As shown in FIG. 2B, the video content 200 can be segmented based on visual, audio, and/or textual features. In the simplified example shown in FIG. 2B, the frames 210 can be divided into segments 220, 230, and 240. Segments 220 are defined by specific detector output textual data. Segments 230 are defined by specific detector output audio data. Segments 240 are defined by specific detector output visual data. As shown, the segments 220, 230, and 240 defined by the corresponding detector output data can overlap and/or include one another. For example, the segment S2 for audio A (reference 230-1) includes frames 210 that are also included in segments 240-1, 240-2, 220-1, and 220-2. Accordingly, the segment definitions for the segments would include an indication of the overlapping frames 210. Segments may also combine multiple features in the visual, audio, and/or textual features.

FIG. 2C illustrates the consequences of overlapping segment definitions when a search is performed, according to various embodiments of the present disclosure. In the example shown, a search performed by the segment searcher 137 for the visual feature "visual B" would result in a matching segment 240-2. In one embodiment, this is referred to as a full match because all the frames 210-5 through 210-7 in the segment 240-2 are associated with the visual feature visual B. However, as illustrated, some or all of the frames 210-5 through 210-7 are also included in segments 230-1 and 220-2. Accordingly, the search for the visual feature "visual B" may also return segment definitions for segments 230-1 and 220-2.

Figure 3:
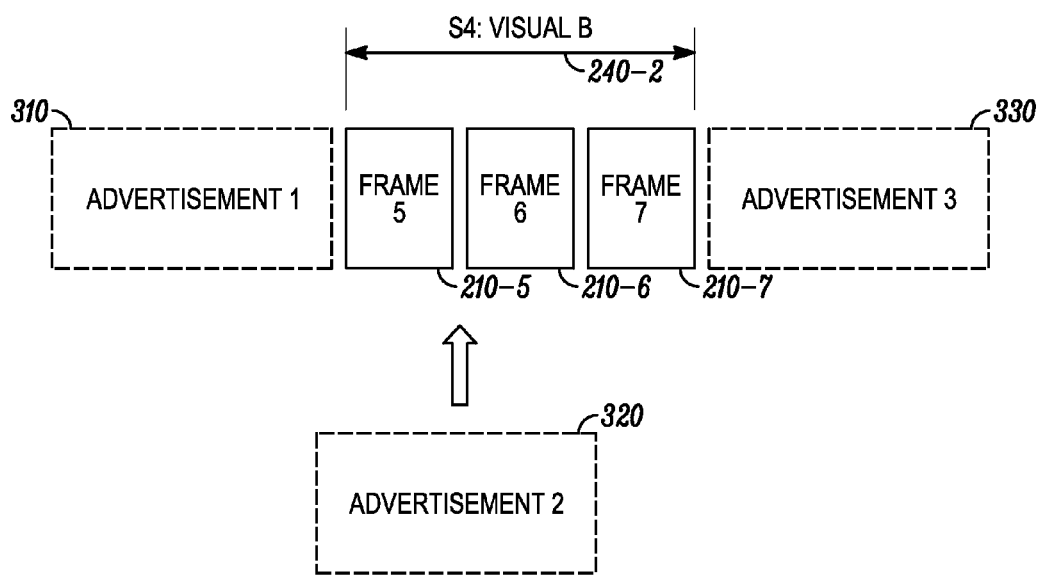
FIG. 3 depicts a schematic of a composite segment of video content, according to embodiments of the present disclosure.

To illustrate the addition of supplemental content, FIG. 3 depicts the segment 240-2 is associated with the visual feature "visual B" selected by a particular user 107 for playback. In one embodiment, in response to the selection of the segment 240-2, the video content segment services 125, or other component in the client device 120, determines one or more advertisements 310, 320, or 330, to insert before, during, or after the playback of segment 240-2. The particular example shown, advertisement 1 (reference 310), may be played before the segment 240-2. Advertisement 2 (reference 320) may be inserted into the segment 240-2 as a commercial break. Finally, advertisement 3 (reference 330) can be played after the segment 240-2. In any such embodiments, the selection of the advertisements 310, 320, and 330, and their placement before, during, or after the segment 240-2 can be based on a set of criteria associated with the specific visual feature "visual B".

Figure 4:
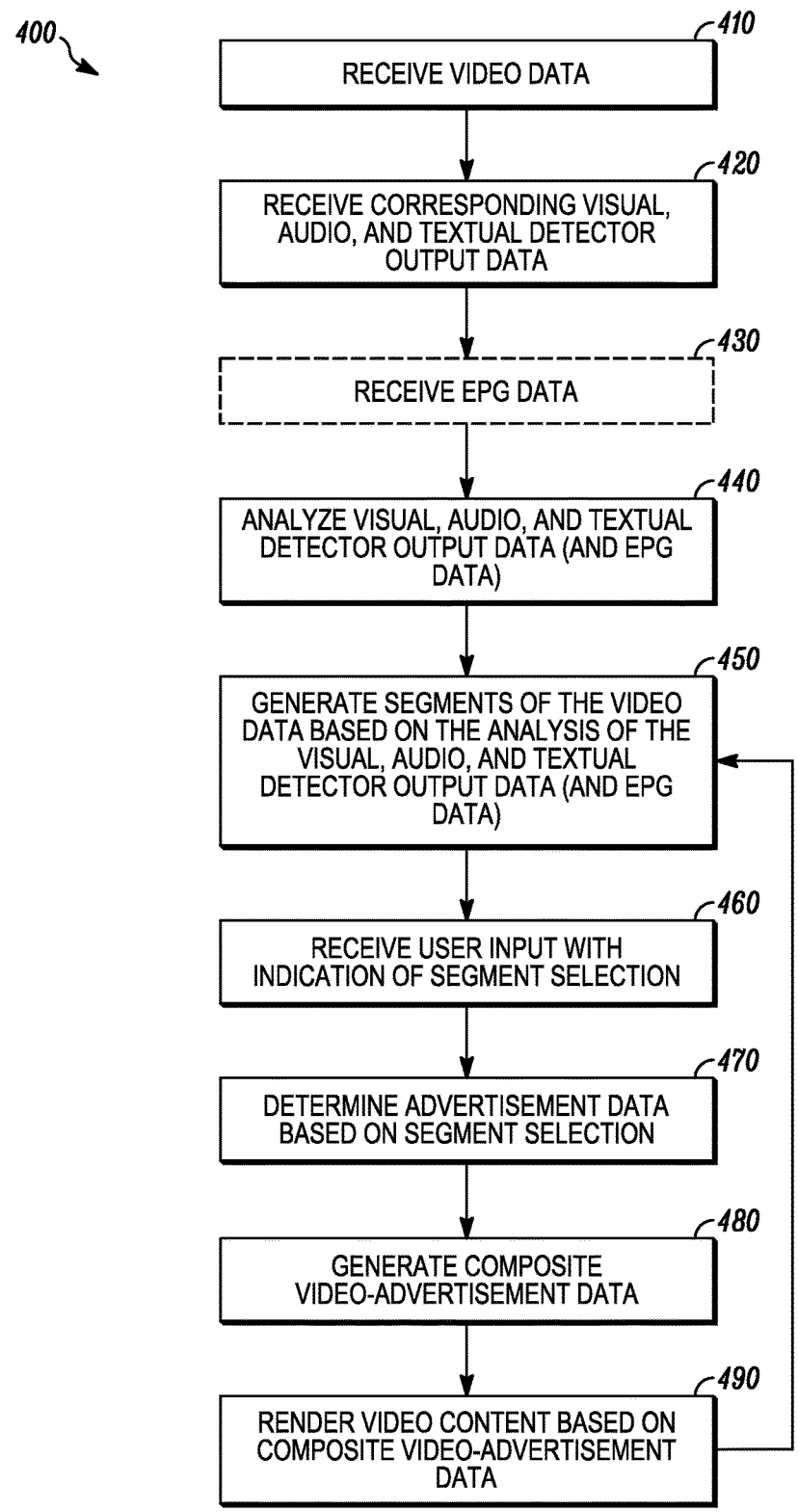
FIG. 4 illustrates a flowchart for a method for generating segments of video content, according to embodiments of the present disclosure.

FIG. 4 depicts a flowchart of a method 400 for segmenting video content and providing supplemental content for enhanced viewing according to various embodiments of the present disclosure. Method 400 can begin at box 410 in which the video content segment services module 125 receives video data 151. The video data 151 can be received directly from a video source 105, server computer 110, or another content server.

At box 420, the video content segment services module 125 can receive visual, audio, and/or textual detector output data 147 corresponding to the video data 151. Examples of visual, audio, and/or textual detector output data 147 include a sequence of one or more numeric vectors corresponding to a sequence of one or more low-level video, audio, and/or text features. In one embodiment, the detector output data 147 can be received from a video data analyzer 111 in a remote server computer 110 that analyzes the video data 151.

At box 430, the video content segment services module 125 can optionally receive EPG data 143 from an EPG source 103. At box 440, the video content segment services module 125 can analyze the visual, audio, and textual detector output data 147 to determine composite features or categories of features relevant to particular user or context. In some embodiments, the video content segment services module 125 can also analyze EPG data 143 for the determination of the context. In one embodiment, determining composite features or categories of features relevant to user may include receiving a key item, such as a search term or specifications for a search object or sound. Accordingly, analyzing the visual, audio, and textual detector output data may include searching for matches to the key item.

At box 450, the video content segment services 125 can generate segments of the video data based on the analysis of the visual, audio, and textual detector output data 147 and/or EPG data. In one embodiment generating the segments of video data can include generating corresponding segment definitions. Any number of segments may be generated based on the visual, audio, and/or textual features in the output data 147. In related embodiments, the video content segment services module 125 can send or provide the video segments and/or the segments definitions to a user interface in one or more client devices 120 displayed to a user 107.

At box 460, the video content segment services module 125, or some other component and a client device 120, can receive user input with the indication of a segment selection. In response to the segment selection, the video content segment services 125 can determine advertising data, at box 470. As described herein, the advertising data can include the specification of a particular commercial video clip, a secondary audio track, and/or textual data that can be superimposed over the visual content. In other embodiments, box 460 may occur before box 450; i.e., segments of a video content may be produced based on the user input.

At box 480, the video content segment services 125 can generate a composite video-advertisement data that includes the frames of the selected segment and the advertisement data. The composite video-advertisement data can also include specification information, enabling the relative user interface engine 121 to render the video content based on the composite video-advertisement data.

In an example of box 440, the step of analyzing and extracting visual, audio, and textual features of the video content is performed by a first device (either server 110 or client device 120), and the box 450 of producing the segments is performed by client device 120. However, box 450 may be performed by server 110 or another computing device separate from server 110 and client device 120. In this embodiment, the video data analyzer 111 sends to the video content segment services 125 a set of audio, video, and text features. Based on this set of audio, video, and text features, video content segment services 125 fuses them, generating composite features, and generates segments of the video content. Then, video content segment services 125 transmits the segmentation 191 produced to the user interface engine 121, and the method proceeds. Optionally, client device 120 simply issues "trick play" commands (fast-forward, rewind, play, pause) for the STB to start playing the video content from the point that begins the segment.

In a further alternative embodiment, the visual, audio, and textual features of the video content and its alternative/supplement content are transmitted to a third-party server, which also stores the content in its internal storage. Subsequently, the third-party server analyzes the audio, the video, and the text contained within the visual, audio, and textual features of the video content to produce various segments for the video content. In this embodiment, client device 120 exchanges information with the third-party server in order to retrieve the segmentation for the video content. User interface engine 121 displays a user interface allowing the user to select a particular segment of the video content. Based on the segment chosen, user interface engine 121 transmits "trick-play" commands to client device 120 in order to fast-forward or rewind to the beginning of the chosen segment of the video content.

In a further alternative embodiment, server 110 receives not only the original content, but also extended content. This extended content represents deleted scenes or alternative versions associated with the content. This extended content can be produced by the same entity that produced the original content or by another entity. In this embodiment, both the original and the extended content are analyzed in order to generate the various segments. Both the original and the extended content are segmented. Each segment will contain a portion of the original content and may or may not contain a portion of the extended content. When the segment contains a portion of the extended content, client device 120 may provide such indication in user interface engine 121. When the user selects a segment, client device 120 may either (1) display first the original segment and then ask the user whether he/she wants to watch the alternative content; (2) display both the original and alternative content; (3) decide whether to display or not the alternative content based on historical information about the user habits or preferences; or (4) decide whether to display or not the alternative content based on the level of interest, or in the level of positive or negative reaction, captured from the user.

In a further alternative embodiment, server 110 receives not only the original and/or extended content, but also complementary content to be displayed in user interface engine 121. This is particularly relevant when user interface engine 121 contains a display; e.g., when the user device is a tablet computer or smartphone. This complementary content contains videos or images with complementary information to the original/extended content in case the user desires additional information than present in the video content. This complementary content can be produced by the same entity that produced the original content or by another entity. In this embodiment, the original, the extended, and the complementary content are analyzed in order to generate the various segments. The original, the extended, and the complementary content are segmented. Each segment will contain a portion of the original content and may or may not contain a portion of the complementary content. When the segment contains a portion of the complementary content, client device 120 transmits such complementary segment to user interface engine 121, which presents to the user in its display.

In another embodiment, client device 120 may rank the segments containing the visual, audio, and textual features of the video content, determining the importance of each of the segments to the user. The ranking is performed by the video content segment services module 125 based on the visual, audio, and textual features of the video content extracted from each of the segments. In this embodiment, video content segment services module 125 is configured to rank the segments based on a user-selectable criteria, or, alternatively, on criteria learned from the user's viewing history. For instance, if the visual, audio, and textual features of the video content relates to a baseball content, the user may decide to watch only segments containing home-runs or plays with high emotion. In this case, video content segment services module 125 would extract and fuse visual, audio, and textual features of the video content that correspond to high emotion to generate the ranking. Subsequently, client device 120 would display to the user indications about the location of the high ranked segments, or would build a summary video containing just the high ranked segments. A method specifically designed to extract emotion from baseball content is described later. Another way to produce the ranking for segments is to estimate the potential attention level of each segment. Such ranking method is based on a priori knowledge about the statistical characteristics of audio/video/text features in the video content that have high correlation with high levels of attention. Using such a priori knowledge, it is possible to determine which segments are likely to generate higher levels of attention and assign a high ranking order to such segments.

Generation of User Defined Segments and Segment Definitions and Processing of Queries In another embodiment, the segments are created based on user input. In this embodiment, in addition to transmitting the video content to client device 120, server 110 also captures and stores the content in content server 115. As the content is captured, it is also analyzed and various audio/video/text features are extracted for each portion of the video content. Examples of audio/video/text features are described above and below, and may include program textual records. These records are stored in analyzed content database 117 as a searchable database and associated with the visual, audio, and textual features of the video content, where different features are stored for several time points within the video content. Based on a user query, which may be made through user interface device 123 that communicates with client device 120 or with content server 115 directly through a different communication channel (e.g., the Internet), video content segment services 125 generates a sequence of segments using one or more of the stored visual, audio, and textual features of the video content. Or, content server 115 can generate the segments and then transmits to client device 120 the information about all the segments in the sequence along with one or more of the segments. Client device 120 then displays the information about the segments in a graphical user interface that allows the user to browse the information about the segments and select one of the generated segments for viewing. If the selected segment is one of the segments transmitted along with the sequence of segments information, then client device 120 immediately starts rendering the segment for the user. Otherwise, client device 120 fetches the selected segment from the content server 115 and displays the segment to the user.

Figure 5:
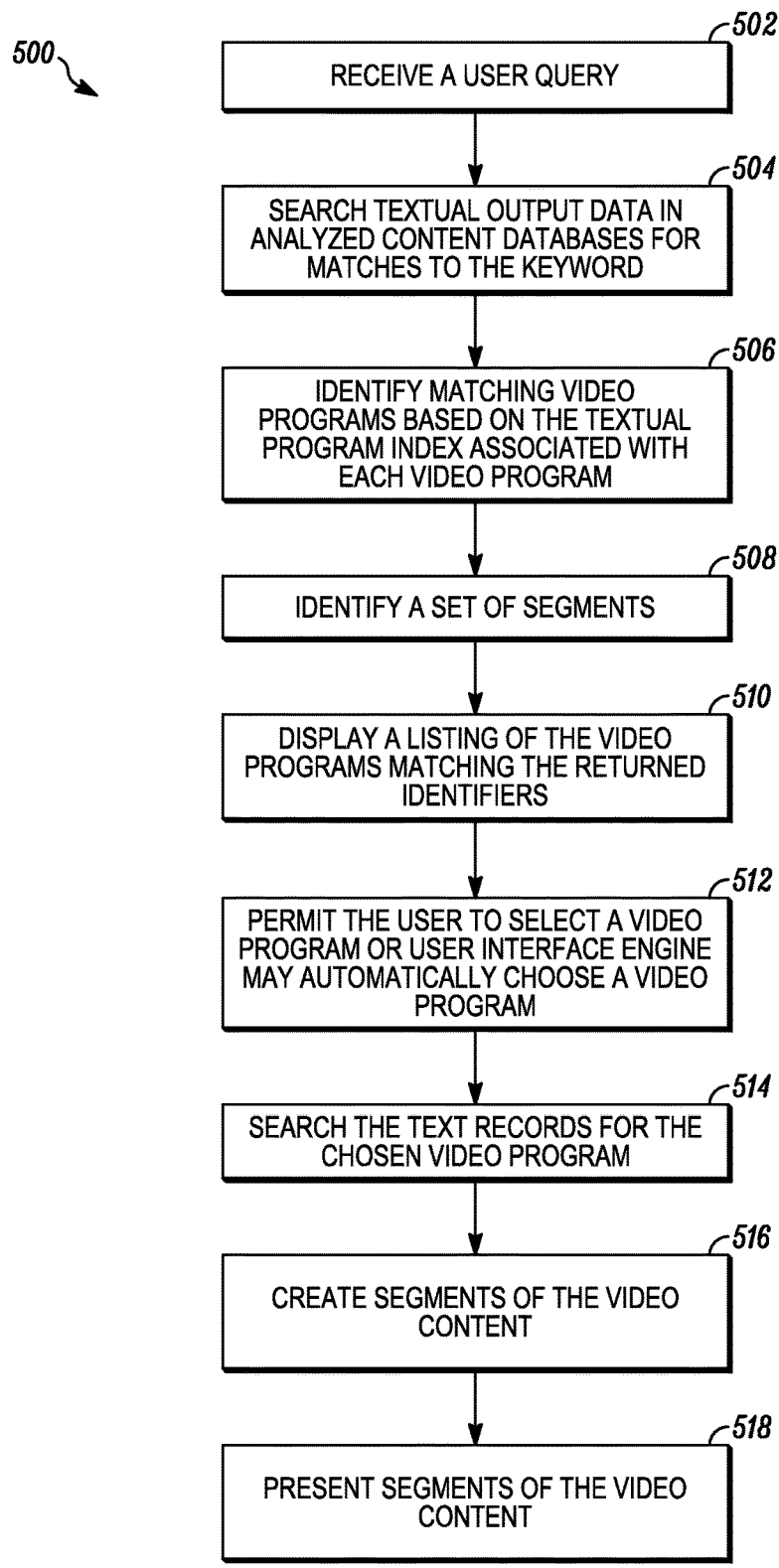
FIG. 5 depicts a simplified flowchart of a method for processing user queries according to one embodiment.

FIG. 5 depicts a simplified flowchart 500 of a method for processing user queries according to one embodiment. At 502, user interface engine receives a user query. User queries can take the form of a textual query, an audio query, a visual query, or any combination of those. For instance, the user query may simply be words or phrases, much like a search engine query. As another example, the user query may be a snippet of audio, a recording, a piece of music. As a further example, the user query may be an image, a sequence of images, or even a short video clip containing both audio and video. As a still further example, the user query may contain words, phrases, and a video clip.

In one example embodiment, the video content segment services module 125 can receive a query that includes one or more keywords. In some embodiments, the user input of keywords can be generated based on recognition of a spoken audio that convert utterances from a user into text keywords. In another embodiment, the video content segment services module 125 can receive key items in the form of text entered using a user input devices such as key board or touchscreen associated with client device 120. In another embodiment, the keywords may be extracted from video content using optical character recognition.

At 504, in response to the query, the segment searcher 137 can search textual output data (or any visual, audio, and/or textual features) in analyzed content databases 117 and/or 141 for matches to the keyword. For example, the textual program indexes that contain text records and corresponding times for significant words for each video program are searched.

At 506, segment searcher 137 identifies matching video programs based on the textual program index associated with each video program. The indexes that contain at least one occurrence of each word in the search query are identified as matching. In one example, the keyword may be included in either the closed-caption data of or the optical character recognized video data specified in various segment definitions.

At 508, the segment searcher 137 can then identify a set of video segments. As described herein, the segments can include specific identifiers of visual, audio, and textual features of the video content and/or time coordinates in a particular video asset in which the keyword can be found. Accordingly, in a particular segment, a specific keyword can be paired with a point time of a given video asset.

For example, for some number N, video assets $C_i$ can be paired with corresponding time points $Tvh_i$ in which a particular key item is determined to occur. Accordingly, in one embodiment, the matching segments can be represented by a set of key item-time point pairs (e.g., $\{(C_1, Tvh_1), (C_2, Tvh_2), \ldots, (C_N, Tvh_N)\}$) that represent the point in time, $Tvh_i$, in which a specific key item occurs in video asset $C_i$. For each pair $(C_i, Tvh_i)$, the video content segment services module 125 can build a segment that includes the portion of the video asset $C_i$ spanning from time $Tvh_i - D_{bef}$ to time $Tvh_i + D_{aft}$, where $D_{bef}$ and $D_{aft}$ are pre-determined values that determine the length of the segment. The segment generated may contain non-contiguous segments from the original video content. Before generating the sequence of segments, the video content segment services module 125 may merge segments that correspond to the same data asset $C_i$ and have time points $Tvh_i$ close to each other.

At 510, continuing in the above example, user interface engine 121 may display a listing of the video programs (e.g., visual, audio, and textual features of the video content) matching the returned identifiers. At 512, user interface engine 121 may permit the user to select a video program or user interface engine 121 may automatically choose a video program. Upon selection of a video program, at 514, segment searcher 137 searches the text records for the chosen video program. In other embodiments, the listing of video programs may not be displayed and the following process is performed for all video programs.

In the searching, the search query is compared to the significant words stored with the text record, and if the significant words contain any words comprised by the search query, the text record is identified as a matching text record. For each matching text record, a windowed text record rank is computed. The windowed text record rank is calculated by counting the number of search query words that are contained in the significant words of the current text record and in the N subsequent text records. Subsequent text records are text records created from the visual, audio, and textual features of the video content immediately following the current text record. The value N may be computed from the search query, such based on the number of words in the search query. Next, segments of the video content are created using the matching text records. Contiguous blocks of matching text records may be identified as a segment. For example, if text records A and B are matching text records, but text record C is not a matching text record, then a segment is created from text records A and B. Segments may also be created from non-contiguous segments. For example, segments A and C may contain similar concepts and are combined into a segment.

A segment score is assigned to the segment, which is computed as the maximum value of the windowed text record rank of the text records within the segment. Finally, at 516, user interface engine 121 presents the segments of the video content to the user. Segments with the highest segment score may be presented first, or more prominently (e.g., higher). If all video programs were analyzed, then segments from various video programs are ranked and then output. The generated segments may be combined with other identified segments, such as segments identified using metadata as described below.

In some embodiments, the video content segment services module 125 can be assisted by one or more distributed content servers (DCS) 140. Each DCS 140 may be associated and/or collocated with a client device 120 or a group of client devices. The use of DCS 140 can reduce the query load in the video content segment services module 125, as well as reduce the video traffic in the transmission network. The main goal of DCSs 140 is to store and respond to user's queries by serving matching segments of the video content directly from its local storage 141. DCS 140 builds its local storage 141 by capturing the video content arriving in the client device 120 associated with it. DCS 140 minimizes the query load and video traffic; however, it is constrained by the amount of local storage. Given the storage constraint, DCS 140 must decide which segments of the video content to maintain and which to discard. In order to reach such decisions, an embodiment of DCS 140 uses a content storage management method that constantly evaluates whether to store new incoming visual, audio, and textual components of the video content, and whether to delete content that was previously stored.

The DCS 140 can respond to user queries by providing matching segments of video assets directly from its local storage (e.g., video data stored in the analyzed content database 141). The DCS 140 can build its local storage by capturing the video data arriving in the client device 120. Based on the physical limitation of the memory in the DCS 140, it can be constrained in how much video data can be stored at a given time. Accordingly, the DCS 140 can manage which segments of which video asset to maintain and which to discard. To determine which video data to retain, the DCS 140 can use a content storage management algorithm that can evaluate whether to store incoming new video data, and whether to delete video data that was previously stored. If the DCS 140 does not have matching segments in its local storage, the DCS 140 may forward the request to the main server computer 110, which finds the matching segments and sends them to DCS 140 for posterior presentation to the end user. In another embodiment, the DCS 140 always forwards user queries to the server computer 110, which sends information to the DCS 140 to assist in the production of the matching segments from the content stored in its local storage.

Predictions of User Interest Using Priority Values

Using the content storage management algorithm, the DCS 140 can generate predictions of user interest. For this, the DCS 140 can assign a priority value (PV) for each segment of a particular video asset. To determine whether and which video data to delete in the DCS 140 to make memory available to record new incoming video data, the DCS 140 can compare the PV of the incoming video data with the lowest PV in storage. If the PV of the incoming video data is higher, than the one or more segments with the lowest PV are deleted and the incoming video data is stored. In this way, the DCS 140 always stores the segments with the highest PV values.

In one embodiment, the content storage management algorithm used by the DCS 140 uses a combination of factors including, but not limited to, historical information, web search engines, and recommendation engines.

In some embodiments, the DCS 140 can use the content storage management algorithm to store information about which and what type of queries a particular user has made in the past. For instance, if the user usually makes queries about a particular soccer team, then the DCS 140 can increase the PV of any segment related to the particular soccer team.

In some embodiments, the DCS 140 can access remote web search engines or the DCS 140 can act as a proxy server for the client device 120 to access remote web search engines. Thus, whenever the DCS 140 detects that the user is searching for a set of words in any search engine, then can increase the PV of any existing segments in its storage and any incoming segment related to the user's web queries.

The DCS 140 can also access recommendation engines to determine segments in the video data that might be of interest to a user and increase the PV of any existing or incoming segment. In such embodiments, the DCS 140 can access one or more recommendation engines to retrieve information collected from the client device 120, such user email account information. The PVs of existing and new segments can be updated based on interests demonstrated by the content of email messages handled by the email account. Accordingly, the DCS 140 can alter the PV of a video segment based on events that occur in email messages (e.g., email regarding specific topics) that indicate particular visual, audio, and/or textual features associated with various segments are still important for the user.

The PVs of existing and future segments are constantly updated given that users' interest change. A segment with a high PV would slowly decrease in value as time goes by unless an event occurs that indicates that this type of segment is still important for the user. Still in this embodiment, when a user query arrives, DCS 140 performs the following steps. DCS 140 verifies whether locally stored content is able to provide matches to the query; if so, DCS 140 uses such segments to respond to the query. If not, DCS 140 forwards the request to the main content server 115, which forwards to DCS 140 the matching segments. Alternatively, before verifying. DCS 140 may forward the request to the main content server 115, which sends to DCS 140 only the information about the matching segments (such an information would indicate the visual, audio, and textual features of the video content and which segment within such content); e.g., the actual video of the matching segments would not be sent to DCS 140 unless the user requests the video. Such information would be used to generate the answer to the query.

In some embodiments, the client device 120 can detect user behavior. For example, the client device 120 can include microphones, accelerometers, cameras and other sensors to observe user reactions to video segments. The video content segment services 125 or the DCS 140 can use such user behavior data to determine or augment PV values for specific video segments and/or the related key items. In such embodiments, the video content segment services 125 and/or the DCS 140 can collect user behavior data from the client device 120. The user behavior data can then be used to inform the PV determination for new video segments associated with similar key items. In such embodiments, the client device 120 can detect audio and video features of the collected user reactions, and the video content segment services 125 and/or the DCS 140 can determine whether the user had a positive, negative, or neutral reaction to the segment. This user behavior data can be associated with the user 107 or the client device 120 and stored in video content segment services module 125, and/or distributed content server 140. The user behavior data can also be used when presenting the available segments of a video data to the user 107. For example, segments that are estimated to generate positive reactions from the user 107 would be presented before segments that generate negative reactions. Also, the user behavior data can be used when ranking segments to produce a highlights or summary version of the particular video asset. In some embodiments, the user behavior data can also be used to bookmark a segment for later repeat viewing by the user 107. Accordingly, the user behavior data may also inform recommendations for other video content. Furthermore, user behavior data can also be used by the video content segment services module 125 when answering user's queries, and by the DCS 140 to determine the PV for segments to retain in storage.

In one embodiment, the PV of segments can be based in part on the attention level which is estimated based on a-priori knowledge about the statistical characteristics of audio/video/text features indicative of high attention, as described above.

In another embodiment, the user reactions to segments can be used to select further segments to present to the user. If the reactions to a first segment are deemed positive, additional segments related to the first segment would be presented. Such functionality allows the video content segment services module 125 or DCS 140 to select a customized sequence of segments, resulting in a different storyline to a user. For instance, consider a video asset containing a comedy show. The video content segment services module 125 or DCS 140 can associate the various segments with each particular joke or punch line. The video content segment services module 125 or DCS 140 can then generate segments associated with each joke available in the video asset. As the user selects the joke to watch, the first segment associated with the selected joke is presented to the user. Alternatively, the joke may be presented as part of a regular linear program presentation. As the user watches the joke, his/her reactions to the segment are collected and used by the system to determine whether or not to present the subsequent segments associated with a similar joke. If the detected reaction was negative, then the system would not present the subsequent segments of the joke line. Optionally, the video content segment services module 125 or DCS 140 can automatically present a segment associated with the next joke. In such embodiment, the system partitions the segments into the different available storylines either automatically, by analyzing the audio, video, textual output detector data, or manually (e.g., based on input from the content producer).

Since the next segment to be presented can depend on the user's reaction to a previously presented segment, it may be necessary to transmit later segments from one video asset before early segments of another video asset. This out-oforder transmission can be implemented in scenarios in which the video source 105 or the server computer 110 uses a "push" or "pull" method of transmitting video data.

The term "push" refers to transmission techniques in which a connection is established and segments of the video data are "pushed" by the server computer 110 through the connection to the client device 120. Examples of a "push" type transmissions include real-time streaming protocol (RTSP) and real-time transport protocol (RTP).

The term "pull" refers to methods of transmission in which the client device 120 requests and downloads the various segments of the video data from the video source 105 or the server computer 110 (e.g., an HTTP server contained in the server computer 110). The video segments downloaded are specified by the client device 120, and may be chosen from a list of available segments and their properties provided to the user 107. Examples of "pull" methods include HTTP Live Streaming, Microsoft Smooth Streaming, and MPEG-DASH.

When client devices 120 use "pull"-type transmission mechanisms, such as HTTP Live Streaming, the various segments created can be stored in an HTTP server in the video content segment services module 125, DCS 140, or the client device 120. Each segment can be stored as one or more a "chunk" files. Chunk files are files that represent one or more portion of a larger file and are used to reduce the burden on networks to provide continuous streaming. Chunk files for different renderings of the segment, such as for different levels of video resolution or quality, can also be stored in separate chunk files. All of the chunk files and corresponding files that list and describe the various chunks of the video data can be stored in the HTTP Server. In addition to these files, new Control files are stored in the HTTP Server. These new control files are called "Alternative Storyline Control Files" (ASC File). The ASC file may be used to define different alternative content versions or storylines, which, in one embodiment, could be organized in a "tree" arrangement, in which the storyline may follow one or another "branch" of the tree at key points in the narrative.

When a client device 120 downloads chunk files, it can also download corresponding control files and the ASC files. The control files can indicate a default sequence of presentation of the various video segments in the chunk files. In addition, each control file can be associated with an ASC file. The ASC file can include instructions that the client device 120 can use to perform various actions when specific emotional indicators are detected while when a video segment of particular chunk file listed in the control file is presented to a user.

The instructions in the ASC file for the performing the various actions can be defined in a number of ways. In one example, the ASC file can include sequential or non-sequential triplets. Each triplet can in include a chunk file identifier, an emotion code, and "jump-to" chunk file identifier. Such triplet entries can be used by the client device 120 to determine if the emotion associated with the emotion code while the video segment included in the chunk file associated with the chunk file identifier is presented, then the client device 120 can play the video segment included in the chunk file associated with the jump-to chunk file identifier at the end of the current video segment. If the ASC file does not contain an entry for the current video segment, or if none of the specified emotions were detected, then the client device 120 can present the video segment included in the next chunk file indicated in the control file.

Example Segment Generation and Classification Types

Figure 6:
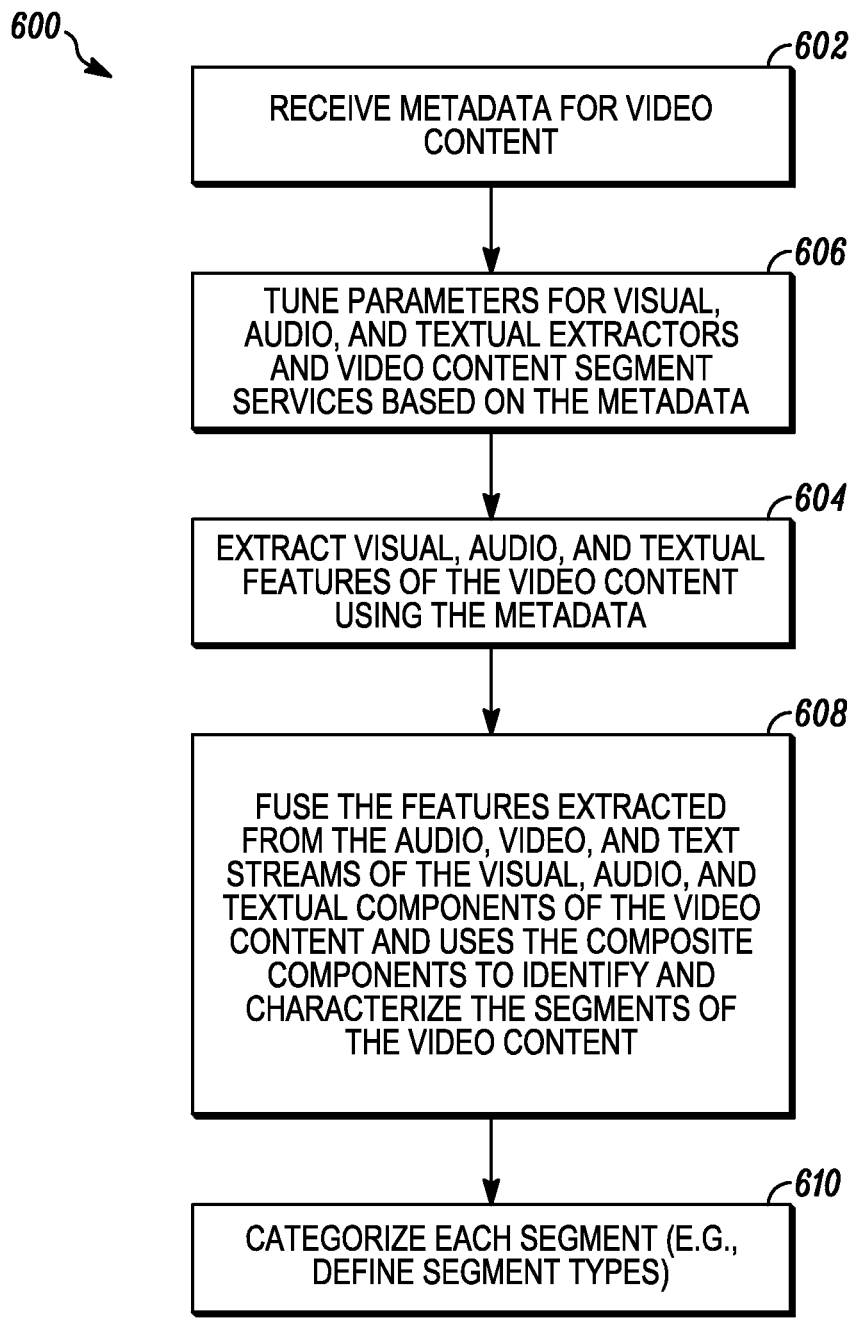
FIG. 6 depicts a simplified flowchart of a method for generating and classifying segments according to one embodiment.

The generation and classification of video segments can be based metadata associated with the video content. FIG. 6 depicts a simplified flowchart 600 of a method for generating and classifying segments according to one embodiment. At 602, video content segment services 125 receives metadata for video content. Such metadata can include data including, but limited to, prior knowledge of the video content and its structure (e.g., metadata or EPG data), detector output visual, audio, and/or textual features, and any combination thereof.

In one example embodiment, both the visual, audio, and textual extractors 112, 113, and 114 and video content segment services 125 are configurable in that their internal operating parameters are tunable depending on the metadata. For example, if a TV program is being analyzed, more than just selecting parameters for a particular genre of TV program is provided. Visual, audio, and textual extractors 111 and video content segment services 125 may have specific parameters for each particular TV program. For instance, visual, audio, and textual extractors 112, 113, and 114 and video content segment services 125 may have a set of specific parameters to analyze a newscast from a local channel 7 and different set of specific parameters to analyze a newscast from local channel 9. The composite feature can be defined for a particular local newscast in the video data broadcast on a particular channel as defined in the corresponding EPG data. The EPG can indicate that the video data is a local newscast. After loading the audio, video, and text search parameters specific for the local newscast, the video content segment services module 125 can analyze the transitions between the newscast and the commercial breaks to determine the segments.

At 604, particular embodiments tune parameters for visual, audio, and textual extractors 112, 113, and 114 and video content segment services 125 based on the metadata. For example, particular embodiments are able to use the EPG and other available data or metadata to tune in the parameters for visual, audio, and textual extractors 112, 113, and 114 and video content segment services 125. The EPG information provides not only the type of visual, audio, and textual features of the video content, but also the specific identity of the visual, audio, and textual features of the video content. Many types of visual, audio, and textual features of the video content represent a series of a particular TV program. Consider for instance the visual, audio, and textual features of the video content corresponding to a local newscast. Every day the local newscast generates a different visual, audio, and textual features of the video content since each corresponds to a particular day's news. However, the series of all visual, audio, and textual features of the video content generated by the local newscast contain significant similarities. For instance, the news anchors, sports anchors, weather personnel, and field reporters are usually the same. Visual, audio, and textual extractors 112, 113, and 114 and video content segment services 125 leverage on this information, using well known methods of speaker identification. Using samples from previously visual, audio, and textual features of the video content recorded from previous local newscasts, speaker models are generated for the main speakers of the newscast. Likewise, each local newscast contains jingles that mark the transitions to and from commercials. Using samples from visual, audio, and textual features of the video content recorded from previous local newscasts, audio models for the jingles can be used to detect when the jingle occurs. Speaker and jingle models are then loaded in the system once the system determines, based on the EPG information, that the visual, audio, and textual features of the video content is a new version of the local newscast.

Similarly, most of the newscasts are produced in a studio environment that remains the same for at least a whole season. Furthermore, visual graphical effects used to indicate to the user a change in news topic are usually similar throughout the season. Thus, using samples from previously recorded visual, audio, and textual features of the video content, it is possible to determine frames that are typically used to mark the transition from one story to another. Also, it is possible to determine the characteristics of color and edges in a studio. Furthermore, it is also possible to train face recognition methods to recognize the different news anchors, sports anchors, weather personnel, and field reporters. The trained models for these visual characteristics can then be loaded in the system once video content segment services 125 determines, again based on the EPG information, that the visual, audio, and textual features of the video content is a new version of the local newscast.

Also, most of the newscasts also contain closed-captions that are produced in the studio. These closed-captions contain more than just the text being spoken. They also contain markers. Operators of teleprompters may use special character sequences to signal a change in speaker or even a change in topic.

After tuning, at 606, visual, audio, and textual extractors 112, 113, and 114 determine visual, audio, and textual features of the video content using the metadata. In one embodiment, the audio features determined from the detector output audio features can include, but are not limited to, trained models for the statistics of speech features from speakers based on the visual, audio, and textual features of the video content, periods of silence, variations in audio energy, pitch of a speaker's voice or other types of audio, audio spectrum and cepstrum information, identification of music versus non-musical sounds, genres of music, identification of speech versus non-speech classifications, sounds of applause or cheering, sounds of laughter, sounds of sirens, sounds of explosions, and the like.

In one embodiment, the visual features can include, but are not limited to, video markers or templates (e.g., graphical features overlaid on the visual content indicating a transition, or identifying a content segment), video editing cuts or transitions, video fade ins/fade outs, light flashes or strobes, detection of long shots or close ups, and the like.

In one embodiment, textual features can include, but are not limited to, closed-caption text, summaries of closed-caption text, closed-caption markers, text detected on-screen text (e.g. graphics or images containing text), text generated by applying speech recognition to the audio track of a program, and the like.

Video content segment services 125 can combine or fuse detector output to create composite features. The composite features that can imply more meaning and may include more information than any one single point of detector output data. In various embodiments, some or all of the features above may be then combined or fused to create composite features with more meaning and information than single extracted features. Video content segment services 125 leverages this information in a new way to assist the system in generating the various segments for the program. Thus, at 608, video content segment services 125 fuses the features of the audio, video, and text features of the video content and uses the composite features to identify and characterize the segments of the video content. The fusion method is dependent of the type of visual, audio, and textual features of the video content, which is indicated in the EPG information.

An example of a fusion method is as follows. Assume that the EPG information indicated that the video content is a local newscast. After loading the audio, video, and text parameters specific for this local newscast, the method first looks for all transitions between the TV program and commercial breaks. Such analysis can include locating a first set of time points $\{Tc_1, Tc_2, Tc_3, \ldots, Tc_N\}$ in which one or more black frames are detected with low audio energy. Black frames and silence in a video data can indicate transitions between commercials or transitions to or from the video asset (e.g., the newscast). Since segments of video assets tend to be larger than the duration of a single commercial, segments of video asset can be identified as any segment in between time points $Tc_i$ and $Tc_{\{i+1\}}$ such that $Tc_{\{i+1\}} - Tc_i$ is larger than a minimum threshold (e.g. 2 minutes). After the video segments are separated from the commercial breaks, the time points $\{Tm_1, Tm_2, \ldots, Tm_M\}$ of closed-caption markers that indicate the beginning of a segment can be identified within all video segments closed captioning textual data. The video data between any two consecutive time points $Tm_j$ and $Tm_{\{j+1\}}$ can thus represent segments for non-linear viewing.

Just segmenting the TV program is not enough to enhance the TV user experience. After the segments within the TV program are identified, it is necessary to define what kind of segment it is. At 610, to further enhance the user experience, after the segments within a video asset are identified, the video content segment services module 125 can categorize each segment (e.g., define segment types). Continuing with the example of a local newscast, each segment of the newscast may be classified as a particular type of news story. For example, the video segment can be categorized into at least one class, such as "General News", "Politics", "Crime", "Technology", "Health", "Sports", "Weather", "Entertainment", "Traffic", and other classes.

To categorize the video segments, the video content segment services module 125 can analyze the video segment, along with corresponding EPG data, to generate the classes. The video content segment services module 125 can extract audio, video, and/or textual features from the detector output data to determine the likelihood of that video segment belongs in a particular class. For this, video content segment services module 125 may use a-priori knowledge about segments based on to the EPG data. For instance, in the case the video data is a local newscast, video content segment services module 125 can extract statistics from audio within the video segment, compare the statistics against known speech patterns for specific people, and determines which person is most likely to be speaking during the video segment. In one example, video content segment services 125 extracts statistics from audio within the segment, compares it against the pre-loaded speaker models, and determines which speaker model provides the highest likelihood for the audio statistics within the segment. If the highest likelihood among all speakers is high enough, then it can be used to classify the segment. For instance, if the speaker model of highest likelihood belongs to the sportscaster, then the segment is labeled as "Sports". If the speaker model of highest likelihood belongs to the news anchor, then the segment is labeled as "General News". Note that there might be more than one speaker in one segment; however, as the likelihood is computed, most likely the speaker model from the speaker that speaks the longest in the segment will provide a higher likelihood output. If the highest likelihood among all speakers is not high enough, then Video content segment services 125 uses the "General News" class.

In some embodiments, the video content segment services module 125 can combine video or textual features with the audio features when determining into which class a particular video segment should be categorized. Certain graphics are often used to signal a transition from one segment class to another. For example, the logo of a baseball team can be used to signal the transition to a "Sports" segment, or a picture of a thunderstorm can be used to signal the transition to a "Weather" segment. Accordingly, when specific logos or pictures are found in the visual content of a particular video segment, then the video content segment services module 125 can use such visual content to increase the specificity with which the video segment is classified. Similarly, if certain keywords related to a particular class are found in the related closed-caption stream or other textual data, then the video content segment services module 125 can use the text to increase the likelihood of the corresponding segment.

Visual, audio, and textual features of the video content can be used also to assist in the segmentation when, for instance, closed-caption markers are not present. For instance, in a local newscast, graphic frames are often used to mark transitions between stories and transitions to and from a commercial break. Such graphic markers can be used to provide the set of points $\{Tm_1, Tm_2, \ldots Tm_M\}$ that indicate the beginning of a segment. As another example, segments can be derived from audio features. In the local newscast example, it is known that segments usually have the following format: one of the news anchor introduces the subject of the news within the segment, and a field reporter or commentator provides further details about the material. After the end of the segment, the camera returns into one of the news anchor in order to introduce the next segment. With this structure in mind, it is possible to extract the audio statistics for every D seconds (e.g., D=3 s) of the whole audio stream and compare the likelihood of the extracted audio statistics against each of the anchors' speaker models. This process produces an output signal whose amplitude varies in time for each of the speaker models. Whenever one of the anchors starts speaking, such an output signal would increase in value significantly and would stay high until someone else starts speaking; e.g., when the anchor hands over to a field reporter. The various points $Tm_i$ that indicate the beginning of a segment would be formed by picking up the points in time in which the output signal grows above a pre-determined threshold.

Visual, audio, and textual features of the video content can also be used to segment sports content. Sports content often contain replays of important parts of the game and such replays need to be indicated to the user such that it is able to identify what is shown as a replay. In one embodiment, video features are used to segment the sports content as follows: based on the EPG information, masks of frames containing computer graphics used by a particular TV network to signal the beginning and end of replays are loaded in the visual module 112 of the video data analyzer 111 to extract video features for indications of replay graphics. Video content segment services 125 would then analyze the visual features of the detector output 147 looking for indications of replay graphics. The points in which replay graphics are found can be marked as segment boundaries. In some embodiments, additional visual, audio, and textual features of the detector output can further influence the selection of segment boundaries.

In broadcast video, the banner frames are often used to signal the start and end of a replay. The banner frames are typically short sequences of visually unique frames. For a TV program, the banner frames are identified and their visual signatures are created and stored offline. For real-time (including non-real-time) TV broadcasting, the signatures of the banner frames are compared with a window of buffered frames of the live TV content. Once banner frames for replay start is found, a signal is generated indicating the start of replay (highlight) and now the search begins for the banner frames that indicating the end of the replay. Once found, another signal is generated indicating the end of the replay.

Since sports is one of the most popular genres, examples of methods to rank segments from sports are described. In one embodiment, video content segment services 125 uses the following visual, audio, and textual features of the video content to classify a sports segment as containing high emotion: (audio) speech variation from normal speech, (video) changes in video from close to long shots, (video) score boards, (text) keywords in closed-captions.

An example in which these visual, audio, and textual features of the video content could be used to classify baseball segments would work as follows. As before, EPG information is used to configure both video data analyzer 111 and video content segment services 125. Based on the EPG information, a first speaker model, from the announcer of the game, is loaded in the audio extractor module 113 for extracting audio features. This speaker model was created from training samples of the announcer's speech while he/she is talking in a non-excited manner. Since some TV networks use two or more announcers or commentators during the game, alternatively, a single speaker model is created from training samples containing all of the announcers and commentators during periods of low emotion in previously recorded games. As the audio stream from the segment is analyzed, a second speaker model is created for the last D seconds (e.g. D=5 s) of the segment. The ratio between the likelihoods of the last D seconds in the second and first speaker models is then computed. A high value for this ratio provides indication to video content segment services 125 that the segment contains the announcer speaking in a different way than its normal speaking way, which is indication of a high emotion scene.

An example in which these visual, audio, and textual features of the video content could be used to classify baseball segments would work as follows. Since high emotional plays in baseball involve "home-runs", it is possible to provide additional information to detect such plays by detecting changes in camera view from close up to long shots. In another example, low level video coding features are used for motion (e.g., camera or objects in scene) activity level estimation for a time period of interest (e.g. during replay). The activity level can be used as one of the input for replay segments ranking, assuming that the larger the motion activity, the more excited the replay content would be. In one embodiment, instead of directly collecting block motion vectors from each frame, the ratio of intra-coded macroblock for a frame is used as an indicator of motion activity in that frame. Average motion activity can be estimated by dividing the accumulated intra-coded macroblock ratios by the number of frames in the time period, which indicates the activity level during the time period of interest.

Figure 7A:
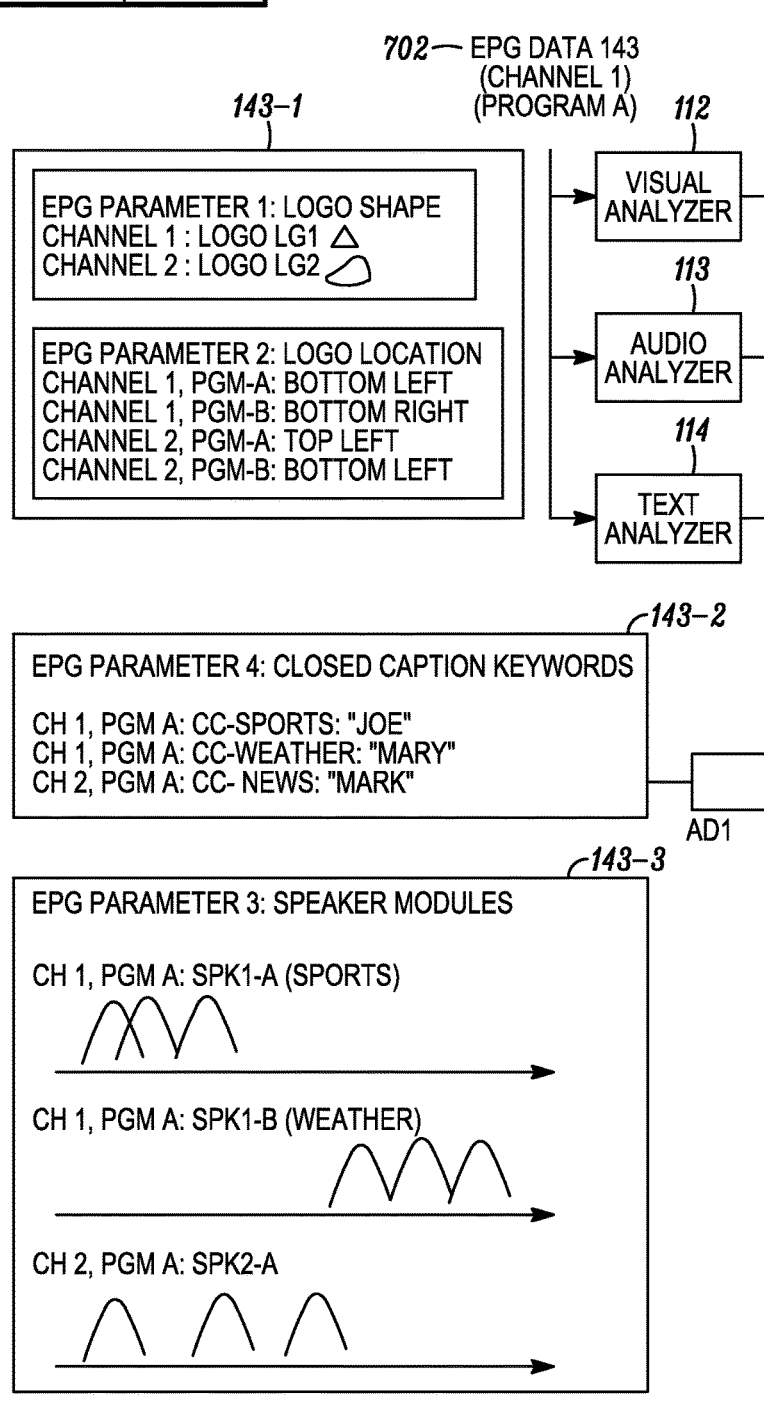
FIGS. 7A and 7B depict an example in which the audio, visual, and textual features of the video asset are extracted by the various analyzers and subsequently fused to identify the video segments according to one embodiment.
Figure 7B:
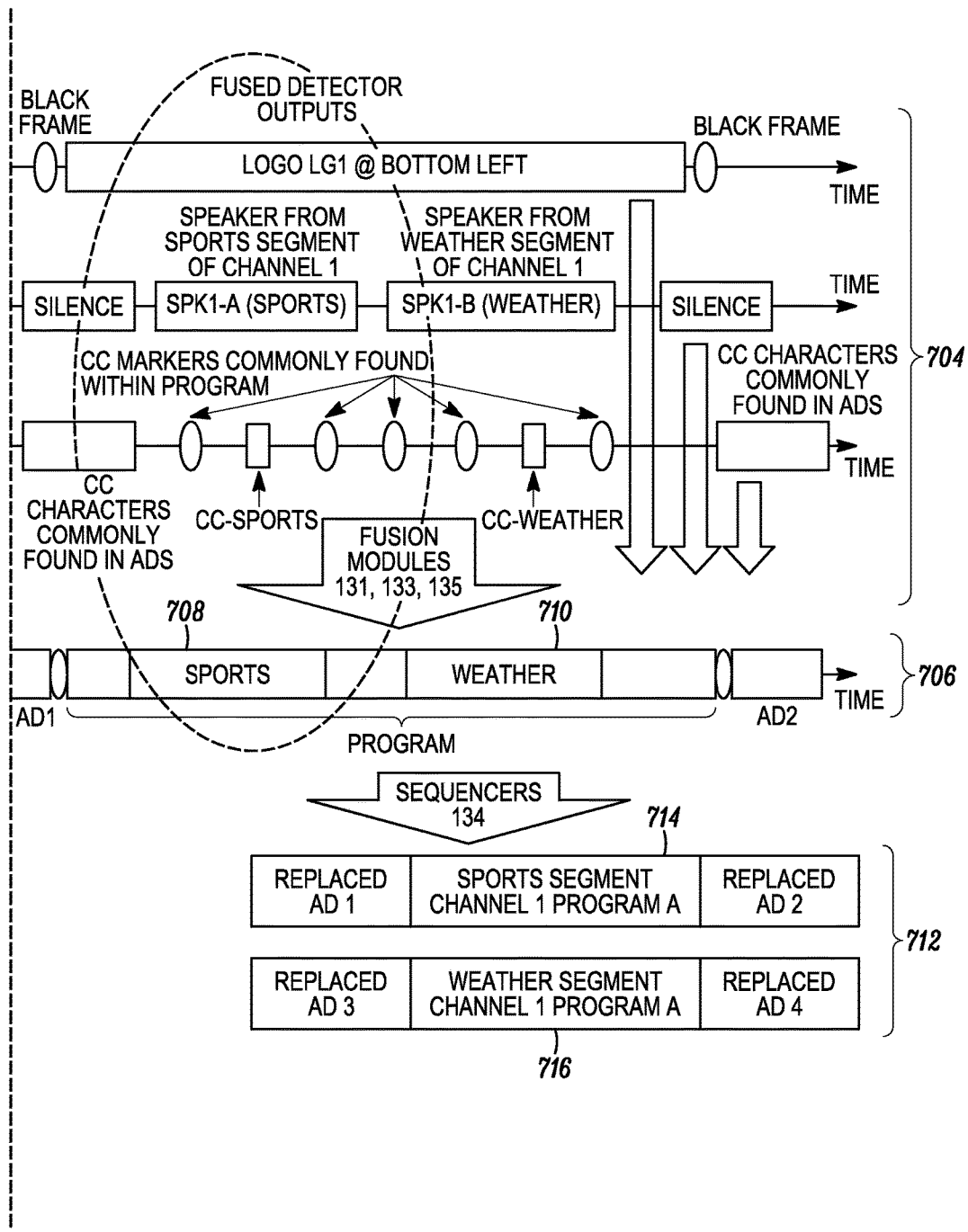

FIGS. 7A and 7B depict an example in which the audio, visual, and textual features of the video asset are extracted by the various analyzers and subsequently fused to identify the video segments according to one embodiment. At 702, the various component elementary streams (e.g. the audio, video and text stream) of video data 151 are fed into the corresponding analyzers 112, 113, and 114 along with EPG Data 143. In some embodiments, such EPG Data 143-1 includes the identification of the channel and program of the video asset, EPG Data 143-2 includes the closed captioning of keywords of the channel and program of the video asset, and EPG Data 143-3 includes the speaker models of the channel and program of the video asset.

In this example, the channel 1, program A and channel 2, program A may correspond to newscasts of different local stations. The information from EPG Data 143 is used to initialize the various analyzers 112, 113, and 114. In some embodiments, the EPG Data 143 initializes the visual analyzer 112 to extract the logo corresponding to channel 1. In some embodiments, the EPG Data 143-1 initializes the visual analyzer to search for the logo corresponding to channel 1 at a particular location on the frames. In some embodiments, the EPG Data 143-3 initializes the audio analyzer 113 to use speaker models corresponding to a particular set of speakers with a particular set of labels. In some embodiments, the EPG Data 143-2 initializes the textual analyzer 114 to extract particular closed-caption markers used by the identified channel and/or program. Also, in some embodiments, the EPG Data 143 initializes the textual analyzer 114 to extract a particular set of keywords in the closed-caption stream and associate such keywords with a particular set of labels. In addition to extracting features that are initialized by the EPG Data 143, the visual, audio, and textual analyzers 112, 113, and 114 also extract features that are applicable to all of the assets; for instance, the visual analyzer 112 may extract time points with black frames, the audio analyzer 113 may extract silence periods, and the textual analyzer 114 may extract closed-caption markers that may be commonly found in advertisements. These extracted features are shown at 704.

Based on the extracted features, the one or more fusion modules 131 combines them to produce a single stream of fused information (also referred to as composite features) shown at 706. For example, fusion module 131 determines a fused sports feature shown at 708 that may include speech from the sports segment SPK1-A and CC markers for CC-sports. Also, a fused weather feature at 710 may include speech from the weather segment SPK1-B and CC markers for CC-weather.

At 712, the segment sequencer 134 uses the information provided by the fusion module 131 to build one or more video segments. In some embodiments, the video segments produced contain portions from different time periods of the video asset. As shown, at 714, a sports segment for Channel 1, program A has been generated based on fused sports features 708. Also, at 716, a weather segment for Channel 1, program A has been generated based on fused weather features 710. In this case, the video segments may have various information removed, such as silence and black frames. In some embodiments, the video segments may contain preceding or following advertisements that are located at various points of the video asset. In other embodiments, the video segments may contain preceding or following advertisements that are located at any other video asset stored at the content server 115 or at a separate database of advertisements. For example, segment sequencer 134 may replace advertisements from the original video content.

Extraction of User Reactions

In order to determine the reaction or emotional response from a user, the client device 120 can include sensors, such as light sensors, cameras, accelerometers, microphones, temperature sensors, and the like, that collect data about the user while the a particular video segment is being presented to the user. In one example, a camera included in a set-top-box can observe body and facial reactions. In another example, a microphone in a smartphone or tablet computer in communication with a client device 120 (e.g., a set-top-box) can detect sounds that can indicate specific user reactions that can indicate positive, neutral, or negative responses.

In various embodiments, the client device 120 can collect sensor data from its own sensors or sensors of other devices to determine or classify the reaction from users while watching a particular video segment or video asset. Based on the collected sensor data, the video data analyzer 111 extracts audio and video features, such as those described in the previous section, and determines whether the user had a positive, negative, or neutral reaction to the segment. Such a determination is based on a previously trained classification method. Using audio/video coming from users having positive, negative, or neutral reactions, it is possible to train a classifier that would automatically determine the user's reaction based on collected audio/video coming from a user.

In one embodiment, user interface engine 120 would have a communication channel with client device 120 (e.g., a WiFi communication channel) in which to transmit to client device 120 the emotion/reaction detected in a particular segment. In another embodiment, this information might be sent by the device to server 110, which would then relay the information to client device 120 over existing communication channels.

In one embodiment, to reduce the amount of time during which the client device 120 monitors the sensors, the server computer 110/client device 120 can dictate the types of sensing and time periods during which the local client device 120 senses user reaction. Such information can be transmitted, for example, through a wireless network communication channel. With such information, the client device 120 can turn on microphones and cameras only at the times indicated by the server computer 110 and/or another client device 120. In other embodiments, the time periods during which the client device 120 performs reaction detection and the types of reaction that the client device 120 monitors can be determined manually (i.e., based on input by the content producer), or automatically by the server computer 110/client device 120 as it evaluates the audio/video features of the video data. For example, consider a video asset in the comedy genre. Often such video data contains laughter from an audience embedded in the audio stream. As the video data is analyzed and laughter is detected in the video data, the time period corresponding to the laughter is transmitted to the client device 120, which turns on the microphone and/or camera only on the indicated time period, and the client device 120 would extract only the audio/video features required to detect the specified emotion, saving processing power in the client device 120.

Multiple users may be watching the same segment of the video content. If each user uses a separate user interface engine 121 (e.g., each user with a tablet computer in his/her lap), then each user interface engine 121 detects and communicates to client device 120 the detected emotion from its associated user. As before, in order to avoid interference between user in the detection of emotions, directional cameras and microphones would be used. In a different embodiment, the networked cameras, microphones, or sensors could be located in the room, separate from user interface engine 121, to detect emotions/reactions from users.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   in a video data analyzer of a first computing device, configuring an extraction, based on metadata associated with video content, of content features;
      wherein the content features are selected from the group consisting of visual features of the video content, audio features of the video content, and textual features of the video content,
      wherein one or more feature extractors corresponding to the content features are selected from the group consisting of a visual feature extractor for content features selected from visual features of the video content, an audio feature extractor for content features selected from audio features of the video content, and a text feature extractor for content features selected from textual features of the video content, and
      wherein configuring the extraction comprises configuring the one or more selected feature extractors to extract the respective content features in accordance with one or more operating parameters that are used internally by the respective feature extractor, and that are tunable by the video data analyzer to alter an extraction behavior of the feature extractor based on the metadata;
   creating a single data stream of fused information for rendering in a client computing device communicatively coupled to one or more distributed content servers, wherein the creating comprises:
      fusing, in a plurality of fusion modules communicatively coupled to the one or more distributed content servers, portions of the content features into composite features that are generated from functions of the multiple features from the content features;
      identifying, by one or more of the plurality of fusion modules, a plurality of video segments comprising one or more video segments of the video content based on the composite features; and
      rendering the created single data stream, in a user interface of the client computing device, by rendering representations of the identified video segments.

2. The method of claim 1, wherein some of the plurality of video segments are identified based on only one content feature.

3. The method of claim 1, wherein identifying the plurality of video segments comprises combining non-contiguous segments from the video content into a segment.

4. The method of claim 1, wherein the multiple features are based on at least two of the group consisting of visual features of the video content, audio features of the video content, and textual features of the video content.

5. The method of claim 1, wherein:
   the composite features include the multiple features from at least two of the visual feature extractor, the audio feature extractor, and the text feature extractor.

6. The method of claim 1, wherein:
   the extraction is performed by a plurality of extractors, and
   the metadata is used to configure an extractor in the plurality of extractors to extract one of visual, audio, and textual features based on the metadata.

7. The method of claim 1, wherein:
   the identifying is performed by a plurality of fusion modules, and
   the metadata is used to configure a fusion module in the plurality of fusion modules to fuse the multiple features into the composite features.

8. The method of claim 7, wherein the fusion module determines a composite feature based on the metadata.

9. The method of claim 1, further comprising classifying the plurality of video segments based on the metadata.

10. The method of claim 1, wherein the metadata comprises program metadata received from an electronic program guide data source.

11. The method of claim 1, further comprising:
    displaying the plurality of video segments;
    receiving a selection of one of the plurality of video segments; and
    displaying the one of the plurality of video segments.

12. The method of claim 11, further comprising adding supplemental content in association with the one of the plurality of video segments based on a feature associated with the one of the plurality of video segments.

13. The method of claim 12, wherein the supplemental content is based on a type of user reaction to the one of the plurality of video segments.

14. An apparatus comprising:
    a plurality of computer processors comprising a video data analyzer processor and one or more segment services processors;
    at least one non-transitory computer readable storage memory coupled to each of the plurality of computer processors and comprising instructions that when executed by one or more of the computer processors cause the one or more of the computer processors to be configured for:
    in the video data analyzer processor, configuring an extraction, based on metadata associated with video content, of content features;
       wherein the content features are selected from the group consisting of visual features of the video content, audio features of the video content, and textual features of the video content,
       wherein one or more feature extractors corresponding to the content features are selected from the group consisting of a visual feature extractor for content features selected from visual features of the video content, an audio feature extractor for content features selected from audio features of the video content, and a text feature extractor for content features selected from textual features of the video content, and wherein configuring the extraction comprises configuring the one or more selected feature extractors to extract the respective content features in accordance with one or more operating parameters that are used internally by the respective feature extractor, and that are tunable by the video data analyzer to alter an extraction behavior of the feature extractor based on the metadata;

creating a single data stream of fused information for rendering in a client computing device communicatively coupled to one or more distributed content servers, wherein the creating comprises:

in a plurality of fusion modules in the segment services processors, fusing portions of the content features into composite features that include are generated from functions of the multiple features from the content features, wherein the segment services processors are communicatively coupled to the one or more distributed content servers;

identifying, by one or more of the plurality of fusion modules, a plurality of video segments comprising one or more video segments of the video content based on the composite features; and rendering the created single data stream, in a user interface of the client computing device, by rendering representations of the identified video segments.

15. A method for creating a single data stream of fused information for rendering in a client computing device communicatively coupled to one or more distributed content servers, the method comprising:

receiving a search query comprising at least one word;

receiving a textual program index associated with each video program from a plurality of video programs stored on a content server;

identifying, by one or more of a plurality of fusion modules, matching video programs from the plurality of video programs based on the textual program index associated with each video program and the at least one word;

receiving a user selection of a matching video program from the matching video programs to identify a selected video program;

receiving a plurality of text records associated with the selected video program;

searching, by one or more of the plurality of fusion modules, the text records of the selected video program to identify matching text records based on the at least one word;

segmenting, by one or more of the plurality of fusion modules, at least one matching video program into a plurality of video segments that include at least one of the matching text records; and rendering the created single data stream, in a user interface of the client computing device, by rendering representations of the identified video segments;

wherein the plurality of fusion modules is implemented by one or more segment services processors each comprising one or more computer processors, the one or more segment services processors communicatively coupled to the one or more distributed content servers.

16. The method of claim 15, further comprising:
presenting a representation of the at least one matching video programs to a user; and
receiving a user selection that identifies a user-selected matching video program.

17. The method of claim 15, further comprising:
presenting at least a portion of the generated at least one matching segment to a user.

18. The method of claim 15, further comprising:
calculating a windowed text record rank from the plurality of text records associated with a matching video program;
identifying contiguous blocks of matching text records as a segment;
assigning a segment score to the segment based upon the text record rank of the segment; and
presenting at least one segment to a user based on the segment score associated with the at least one segment.

19. The method of claim 15, wherein receiving the textual program index associated with each video program comprises:
creating a plurality of text records for each video program, wherein each text record comprises at least a start time and a representation of text for the text record;
creating the textual program index from the plurality of text records for each video program; and
storing the textual program index for each video program with an identifier for the video program.

20. The method of claim 15, wherein the plurality of video segments are combined with previously generated segments based on extraction of features in the video program.

* * * * *